United States Patent
Davis et al.

(10) Patent No.: US 6,282,522 B1
(45) Date of Patent: *Aug. 28, 2001

(54) INTERNET PAYMENT SYSTEM USING SMART CARD

(75) Inventors: Virgil M. Davis, Los Altos; Suzanne C. Cutino, San Francisco; Michael J. Berg, Belmont; Fredrick Sidney Conklin; Steven John Pringle, both of Oakland, all of CA (US)

(73) Assignee: Visa International Service Association, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/951,614

(22) Filed: Oct. 16, 1997

Related U.S. Application Data

(60) Provisional application No. 60/045,883, filed on Apr. 30, 1997.

(51) Int. Cl.⁷ .................................................. G06F 17/60
(52) U.S. Cl. .............................. 705/41; 705/44; 235/375; 380/24
(58) Field of Search .................................. 705/26–27, 41, 705/42, 43; 235/375, 376, 377, 378, 379, 380, 381, 382, 382.5, 188; 395/200.3, 186, 187; 380/24

(56) References Cited

U.S. PATENT DOCUMENTS 4,691,355   9/1987   Wirstrom et al. ....................... 380/23

(List continued on next page.)

FOREIGN PATENT DOCUMENTS

WO 96/04618   2/1996   (WO) .
WO 96/13791   5/1996   (WO) .
WO 96/32701   10/1996   (WO) .

OTHER PUBLICATIONS

Santo, Brian; "The NetBill Electronic Commerce Project", Mar. 20, 1995: pp 1–14 Electronic Engineering Times.*
Cash ™ Secure Internet Payment Service ™ "CyberCash's Secure Internet Payment Services", CyberCash, Inc., Reston, Virginia 22091.

(List continued on next page.)

*Primary Examiner*—Reba I. Elmore
(74) *Attorney, Agent, or Firm*—Beyer Weaver & Thomas, LLP

(57) ABSTRACT

An architecture and system uses a smart card for payment of goods and/or services purchased on-line over the Internet. A client server on a client terminal controls the interaction with a consumer and interfaces to a card reader which accepts the consumer's smart card. A payment server on the Internet includes a computer and terminals that contain security cards to handle the transaction, data store and collection. Also connected over the Internet is a merchant server advertising the goods and/or services offered by a merchant for sale on a web site. The merchant contracts with an acquirer to accept smart card payments for goods and/or services purchased over the Internet. A consumer uses his smart card at the client terminal in order to purchase goods and/or services from the remote merchant server. The Internet provides the routing functionality between the client terminal, merchant server and payment server. The client terminal emulates a security card in interacting with the smart card, and the responses received are grouped together and sent as a draw request message to the payment server. The payment server then emulates the smart card in an interaction with the security card. The security card delivers the expected smart card signature to the payment server and/or on to the client terminal or merchant server to reduce message traffic between the entities on the network. The comparison of the smart card signature to an expected value can occur at any location. Encryption is used for security.

57 Claims, 20 Drawing Sheets

U.S. PATENT DOCUMENTS

| | | | |
|---|---|---|---|
| 4,933,971 | | 6/1990 | Bestock et al. ............... 380/44 |
| 5,175,416 | | 12/1992 | Mansvelt et al. ............ 235/379 |
| 5,365,589 | | 11/1994 | Gutowitz ..................... 380/43 |
| 5,373,561 | | 12/1994 | Haber et al. .................. 380/49 |
| 5,416,842 | | 5/1995 | Aziz ............................. 380/30 |
| 5,440,633 | | 8/1995 | Augustine et al. ............ 380/23 |
| 5,455,863 | | 10/1995 | Brown et al. ................. 380/23 |
| 5,497,421 | | 3/1996 | Kaufman et al. ............. 380/23 |
| 5,517,569 | | 5/1996 | Clark ............................ 380/52 |
| 5,524,052 | | 6/1996 | Augustine et al. ............ 380/49 |
| 5,544,086 | * | 8/1996 | Davis et al. ................. 364/408 |
| 5,548,106 | | 8/1996 | Liang et al. ................ 235/454 |
| 5,559,887 | * | 9/1996 | Davis et al. .................. 380/24 |
| 5,633,930 | * | 5/1997 | Davis et al. .................. 380/24 |
| 5,665,951 | * | 9/1997 | Newman et al. ............ 235/375 |
| 5,706,442 | * | 1/1998 | Anderson et al. ............. 705/27 |
| 5,710,887 | * | 1/1998 | Chelliah et al. .............. 705/26 |
| 5,742,845 | * | 4/1998 | Wagner ......................... 710/11 |
| 5,790,677 | * | 8/1998 | Fox et al. ..................... 380/24 |
| 5,963,924 | * | 10/1999 | Williams et al. .............. 705/40 |
| 5,996,076 | * | 11/1999 | Rowney et al. ............. 713/201 |
| 6,016,484 | * | 1/2000 | Williams et al. .............. 705/39 |
| 6,032,135 | * | 2/2000 | Molano et al. ................ 705/41 |

OTHER PUBLICATIONS

Leslie Marable, "A Test Moves Net–Based Bill Payment a Step Closer", WebWeek, The Newspaper of Web Technology and Business Strategy, Vol. Three, Issue Three, Feb. 3, 1997.

EPO, PCT International Search Report, PCT/US 98/08806, Aug. 24, 1998, (4 pages.).

Lynch, et al., "Digital Money, The New Era of Internet Commerce", Copyright © 1996, John Wiley & Sons, Inc.

Tekla S. Perry, "Electronic Money: Toward a Virtual Wallet", IEEE Spectrum, Feb. 1997.

Edward W. Kelley, Jr., "The Future of Electronic Money: A Regulator's Perspective", IEEE Spectrum, Feb. 1997.

Marvin A. Sirbu, "Electronic Payments—Credits and Debits on the Internet", Carnegie Mellon University, IEEE Spectrum Feb. 1997.

David Chaum, et al., "Minting Electronic cash", IEEE Spectrum Feb. 1997.

Peter S. Gemmell, "Traceable E–Cash", Sandia National laboratories, IEEE Spectrum Feb. 1997.

Stanley E. Morris, "Crime and Prevention: A Treasury Viewpoint", IEEE Spectrum Feb. 1997.

Baldwin, et al., "Locking the E–Safe", IEEE Spectrum Feb. 1997.

Carol Hovenga Fancher, "In Your Pocket Smartcards", IEEE Spectrum Feb. 1997.

Michael C. McChesney, "Banking in Cyberspace: An Investment in Itself", IEEE Spectrum 1997.

Steven M.H. Wallman, "Technology Takes to Securities Trading", IEEE Spectrum 1997.

Alfred R. Berkeley,III, "Nasdaq's Technology Floor: Its President Takes Stock", IEEE Spectrum 1997.

Mike Ter Maat, "The Economics of E–Cash", IEEE Spectrum 1997.

Howard Anderson, "Money and the Internet: A Strange New Relationship" IEEE Spectrum 1997.

"To Probe Further", Special Issue, IEEE Spectrum 1997.

* cited by examiner

Stored-Value Card Example

Service Payment Terminal

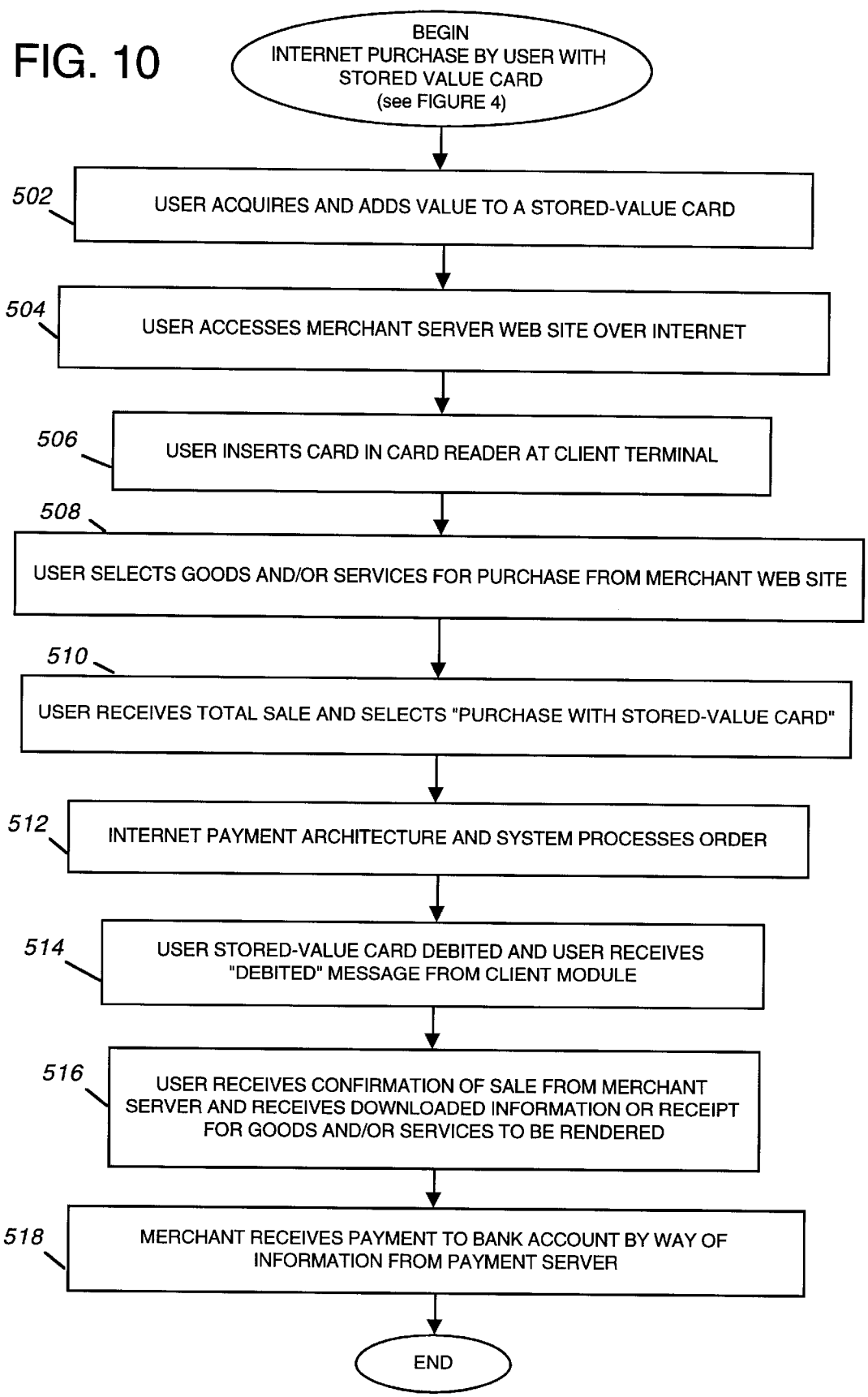

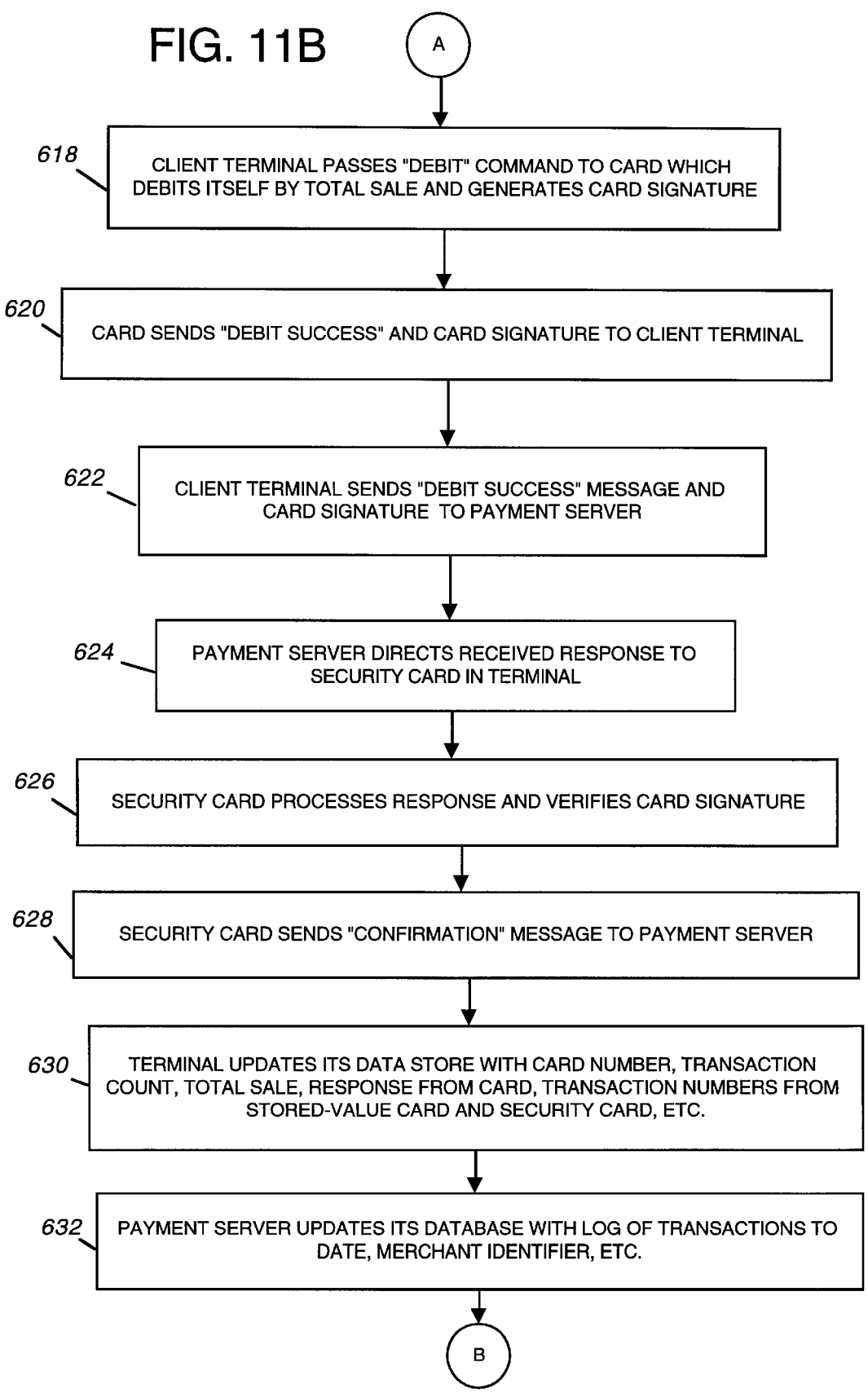

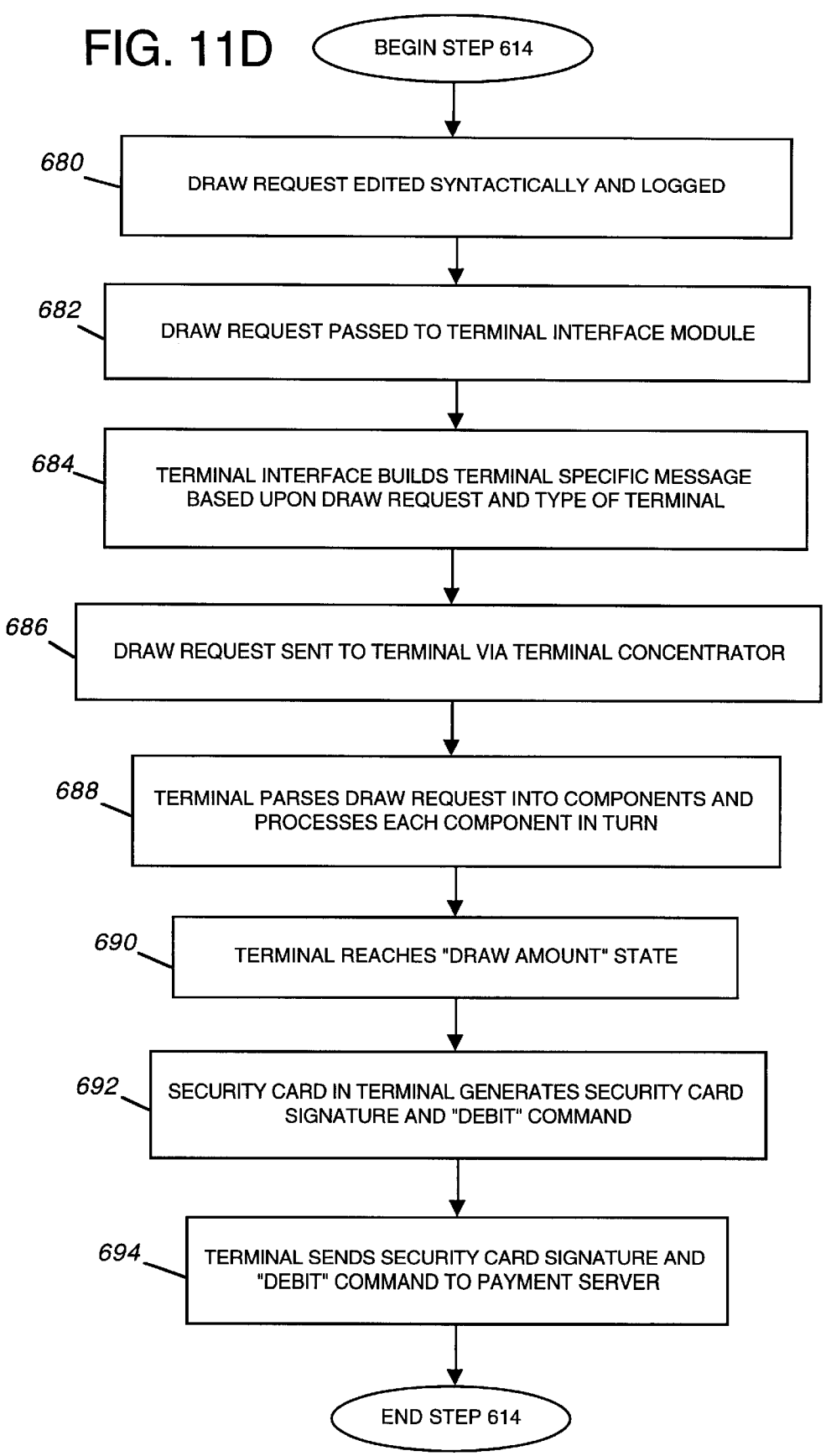

INTERNET PAYMENT SYSTEM USING SMART CARD

CROSS-REFERENCE TO RELATED APPLICATIONS

This application claims priority of provisional U.S. patent application Ser. No. 60/045,883 by Davis et al., filed Apr. 30, 1997, entitled "Architecture for Internet Payment Using Stored-Value Card" which is incorporated by reference.

FIELD OF THE INVENTION

The present invention relates generally to a payment system using a computer network. More specifically, the present invention relates to a payment system over an open network such as the Internet using a smart card.

BACKGROUND OF THE INVENTION

With the explosive growth in open networks such as the Internet over the past several years, and the rapid increase in the number of consumers with access to the World Wide Web, there has been a great deal of interest in the development of electronic commerce on the Internet.

A variety of service providers have introduced payment schemes to support the purchase of goods or services on-line in a virtual merchant environment. These schemes have used a variety of approaches with varying degrees of security and protection of payment information as it is transmitted across the Internet. These approaches have used several models based on traditional payment methods existing in the face-to-face retail market, including credit/debit cards, checks and cash. However, for a variety of reasons, various of these numerous schemes have particular drawbacks.

Currently, a consumer may use his or her traditional credit or debit card to make a purchase over the Internet. A consumer simply supplies his card account number which is then transmitted across the Internet to a merchant and the payment transaction is completed in the traditional manner for a credit card. Often, these account numbers are transmitted over the Internet with extremely limited or no security. Security can be improved through use of the "Secure Electronic Transaction" protocol published by Visa International and Mastercard in 1996. These transactions still require some form of card validation and performance of a balance check. These checks are performed on-line between the merchant, an acquirer and an issuing bank, a process which can become time consuming and inefficient when the value of the transaction is low, or when a number of small value transactions will be taking place in a short time span.

Other service providers are establishing Internet payment systems based upon an electronic check model. For example, the Financial Services Technology Consortium, a non-profit membership organization that includes financial services providers, universities, industrial partners, and government agencies, initiated an Internet electronic check product in June, 1995. The electronic check is modeled on the paper check, but is initiated electronically using digital signature and public cryptography. Deposits are gathered by banks via electronic mail and cleared through existing channels such as the Automated Clearing House (ACH). However, use of such an electronic check by a consumer has various drawbacks. For one, digital signatures and public encryption necessitate use of a certifying authority adding additional entities and "net" trips to the transaction. Also, cardholder registration is needed.

Other providers of Internet check-based services include NetCheque at USC, NetChex operated by Net1 in Phoenix, OnLine Check Systems in Denver, and RediCheck in Salt Lake City which all provide on-line services to merchants and consumers based on submission of bank drafts.

Other Internet payment alternatives are modeled on cash transactions and include a variety of schemes. A credit card purchase can also be made using CyberCash, in which the consumer appends his credit card number to an electronic invoice received from the merchant, returns the credit card number to the merchant which is then processed and forwarded on to CyberCash where it is then treated like a normal credit card transaction. However, this technique suffers from some of the disadvantages discussed above with respect to traditional credit card transaction on the Internet. Also, this technique requires additional work by the merchant in processing the credit card number. Debit transactions may also be completed in which a consumer receives prefunded coins in an "electronic wallet", but require a consumer to open a CyberCash account in advance. Such a scheme requires a consumer to establish ahead of time a relationship between the consumer's bank and CyberCash and to pre-fund the cyber coins. One drawback to this scheme implemented by CyberCash is a minimum purchase price of 25 cents.

A digital, token-based system for Internet transactions has been implemented by DigiCash. With DigiCash, so-called "digital coins" are purchased from DigiCash from a pre-funded deposit account and stored on the consumer's hard drive. These digital coins are then used for an Internet transaction with a merchant. For example, to use DigiCash, the consumer sends money to a bank through a credit card or automated teller transaction, and the bank sends the consumer an equivalent amount of cash in the form of digital coins as an encrypted electronic mail message containing a list of 64-bit numbers. Each number corresponds to a specified amount of money, which is recorded by the issuing bank. For instance, if a consumer sends a bank $10.00, the consumer receives an encrypted electronic mail message containing a 64-bit number that is worth the equivalent of $10.00. To purchase something of value on the Internet from a merchant, the consumer sends the merchant the number, the merchant forwards the number to the bank, and the bank credits the merchant account for the $10.00. This scheme has disadvantages in that the consumer must first set up a relationship with DigiCash and use a credit card or similar instrument to purchase these digital coins, which then must be downloaded to the consumer's computer. This transaction can be time consuming for the consumer and is subject to fraud. In addition, a merchant must be set up to not only accept these digital coins, but also to verify their authenticity, to confirm the transaction, and then finally to forward these numbers on to his bank in order to finally get paid. One drawback from the merchant's point of view is that much of the transaction work must be performed by the merchant. In other words, the merchant must keep track of these digital coins and later submit them to either DigiCash or to a bank to get paid.

Another scheme for completing an Internet transaction is offered by First Virtual Holding, Inc. First Virtual offers a software solution based upon a unique identification number and electronic mail confirmation. To use this scheme, a consumer opens a special account with First Virtual and then receives a confidential identification number. When the consumer wishes to purchase a product or service over the Internet, he or she sends an electronic mail message containing the confidential identification number to the merchant. The merchant then sends the number to First Virtual by electronic mail for verification and identification of the customer. First Virtual then confirms with the consumer by electronic mail that the consumer did indeed initiate the transaction and wishes to make the purchase. There are drawbacks to this scheme in that the consumer must first open a special account with First Virtual. Also, the merchant must communicate with First Virtual to identify the customer and to identify the customer's credit card account number that is identified by the confidential identification number. Once the customer's credit card account number has been identified, payment to the merchant occurs in a manner similar to a traditional credit card transaction. Also, there is a minimum of 50 cents and time delays can be long.

Aside from payment schemes over the Internet, a technique in use for performing a financial transaction at a stand-alone terminal uses a smart card. A smart card is typically a credit card-sized plastic card that includes a semiconductor chip for holding the digital equivalent of cash directly, instead of pointing to an account or providing credits. When a card of this kind is used to make a purchase, the digital equivalent of cash is transferred to the merchant's "cash register" and then to a financial institution. Stored-value cards are either replenishable (value can be reloaded onto the card using a terminal) or non-replenishable (the card is decremented in value for each transaction and thrown away when all its value is gone).

Physically, a smart card often resembles a traditional "credit" card having one or more semiconductor devices attached to a module embedded in the card, providing contacts to the outside world. The card can interface with a point-of-sale terminal, an ATM, or a card reader integrated into a telephone, a computer, a vending machine, or any other appliance. A microcontroller semiconductor device embedded in "processor" smart card allows the card to undertake a range of computational operations, protected storage, encryption and decision making. Such a microcontroller typically includes a microprocessor, memory, and other functional hardware elements. Various types of cards are described in "The Advanced Card Report: Smart Card Primer", Kenneth R. Ayer and Joseph F. Schuler, The Schuler Consultancy, 1993, which is hereby incorporated by reference.

One example of a smart card implemented as a processor card is illustrated in FIG. 1. Of course, a smart card may be implemented in many ways, and need not necessarily include a microprocessor or other features. The smart card may be programmed with various types of functionality, such as a stored-value application; credit/debit; loyalty programs, etc. For the purpose of this disclosure, card 5 is programmed at least with a stored-value application, and will be referred to as "stored-value" card 5.

Stored-value card 5 has an embedded microcontroller 10 that includes a microprocessor 12, random access memory (RAM) 14, read-only memory (ROM) 16, non-volatile memory 18, an encryption module 22, and a card reader interface 24. Other features of the microcontroller may be present but are not shown, such as a clock, a random number generator, interrupt control, control logic, a charge pump, power connections, and interface contacts that allow the card to communicate with the outside world.

Microprocessor 12 is any suitable central processing unit for executing commands and controlling the device. RAM 14 serves as storage for calculated results and as stack memory. ROM 16 stores the operating system, fixed data, standard routines, and look up tables. Non-volatile memory 18 (such as EPROM or EEPROM) serves to store information that must not be lost when the card is disconnected from a power source but that must also be alterable to accommodate data specific to individual cards or any changes possible over the card lifetime. This information might include a card identification number, a personal identification number, authorization levels, cash balances, credit limits, etc. Encryption module 22 is an optional hardware module used for performing a variety of encryption algorithms. Card reader interface 24 includes the software and hardware necessary for communication with the outside world. A wide variety of interfaces are possible. By way of example, interface 24 may provide a contact interface, a close-coupled interface, a remote-coupled interface, or a variety of other interfaces. With a contact interface, signals from the microcontroller are routed to a number of metal contacts on the outside of the card which come in physical contact with similar contacts of a card reader device.

One possible use of a stored-value card by a consumer is illustrated in FIG. 2. FIG. 2 illustrates a block diagram of a customer operated service payment terminal 50. A customer typically uses such a service payment terminal in a face-to-face environment in order to purchase goods in a store or directly from the terminal itself. Service payment terminal 50 can be an attended device or it can be integrated into a self-service device such as a vending machine or public telephone. For example, the service payment terminal may be incorporated into a soda machine in order to dispense sodas to a customer in which the customer pays by inserting the stored-value card. Or, the service payment terminal may be a point-of-sale terminal such as is found at a check-out counter where a customer inserts his stored-value card in order to purchase goods.

Service payment terminal 50 includes a router 51, a user interface 52, a card handler/reader 54, a security card handler 56, a security card 58, a terminal application 60, a data store 64 and a concentration point handler 66. Router 51 is hardware and software for routing information between functional blocks. User interface 52 controls the status of displays on the terminal and supplies instructions to the user. For example, the user interface provides instructions relating to insertion of stored-value card 5 or security card 58. Also, the user interface provides instructions and/or buttons for the customer to interact with terminal application 60 in order to purchase goods and/or services. Card handler 54 provides a physical card reader and associated software for accepting and communicating with stored-value card 5. Similarly, security card handler 56 provides a card reader and associated software for communicating with security card 58. In conjunction with security card handler 56, security card 58 controls the command sequence of the terminal and provides transaction and a batch security.

Terminal application 60 receives commands and information about the transaction and initiates the actual purchase. In addition, terminal application 60 is responsible for all application specific functionality such as guiding the customer through the use of the terminal via a display, and for providing all hardware and software needed to provide the user with a good and/or service once it has been informed by the security card that an appropriate value has been deducted from the stored-value card.

Data store 64 controls the storage of purchase transactions and totals. Concentration point handler 66 controls the sending and receiving of information to and from a concentration point. Concentration point 68 is a staging computer that communicates with any number of service payment terminals to collect batches of transactions. The concentration point then sends these transaction batches to a clearing and administration system for processing (such as in FIG. 3).

Once processed, batch acknowledgments, along with other system updates are sent to the terminals via the concentration point. The concentration point ensures a successful transfer of data between service payment terminals and the clearing and administration system, and prevents overloading of the clearing and administration system. The service provider contracts with a concentration point for collection of the service payments. The concentration point may also be an existing central facility such as a telephone company that collects its own payments from card telephones.

Such a service payment terminal 50 allows a customer to use a stored-value card for the payment of goods and/or services, generates a payment result from a transaction, and bundles individual payment results into a collection for transfer to a clearing and administration system, which then transfers funds that had been debited from a customer's stored-value card to the merchant whose goods and/or services had been purchased from the terminal.

FIG. 3 illustrates an environment 100 useful for issuing stored-value cards and reconciling transactions performed with such a card. A terminal supplier 102 builds the equipment used by a service provider 104 to provide goods and/or services to customers having a stored-value card at a service payment terminal 50. Card Supplier 106 contracts with an integrated circuit manufacturer and a card manufacturer for integrated circuits and plastic card bodies, then embeds the integrated circuits into the cards and initializes them with a serial number. It then delivers the cards to card issuer 108. In conjunction with clearing and administration system 110 (such as a system provided by Visa International of Foster City, Calif.), card issuer 108 personalizes new cards and then transfers these cards to individuals (cardholders 112). The cardholder may then charge the card with value prior to use. Alternatively, the card may come with value already loaded. The cardholder 112 may then use the card at a service payment terminal 50 to purchase goods and/or services from service provider 104. Terminal 50 then debits the value from the card, thus creating a service payment.

Periodically, all transactions are sent in a data file from terminal 50 via concentration point 68 and an acquirer 114 to clearing and batch administration system 110 along with accumulated service payment batches from other terminals. Based upon this collection data, clearing and administration system 110 then receives money from card issuer 108 which had originally come from cardholder 112. Clearing and administration system 110 then transfers a lump sum to acquirer 114 using a suitable settlement service (such as one provided by Visa International) to pay the various service providers having a relationship with acquirer 114. Based upon the previous collection data, acquirer 114 then transfers an appropriate amount of money to each service provider 104 reflecting the value of the goods and/or services that that service provider had provided that day to cardholders based upon deductions from their stored-value cards.

Although such a service payment terminal described above is useful for the on-site purchase of goods by a consumer with a smart card, it does not permit the purchase of goods and/or services by a customer over a network. Nor does such a terminal permit the immediate transfer of electronic information to a consumer's computer. Service payment terminals are typically specially-designed units of hardware and software located at a merchant site. Furthermore, the service payment terminal is designed to integrate into one hardware location the functions of the terminal application (providing goods and/or services), a card handler for the stored-value card, and the transaction management embodied in the security card. Such a design is not suitable for transactions where a customer may wish to perform a transaction from almost any location (including the home or office) quickly and easily with a minimum of prearranged set-up and expense. Furthermore, although various Internet payment schemes have been suggested, they are not oriented toward small value transactions, and do not allow the use of a smart card for transactions over the Internet.

Thus, it would be desirable to have an architecture and system that would allow a consumer to quickly and easily perform transactions over an open network such as the Internet using a smart card. It is also desirable to have an architecture and system in which a user may use a smart card for both purchases over the Internet as well as purchases at existing service payment terminals.

SUMMARY OF THE INVENTION

To achieve the foregoing, and in accordance with the purpose of the present invention, an architecture and system is disclosed that enables the use of a smart card for payment of goods and/or services purchased on-line over an open network such as the Internet.

The present invention provides an electronic commerce payment solution offering consumers an on-line equivalent to purchases with cash or coins. It extends the notion of a smart card to the Internet marketplace, providing an alternative for low-value transactions. The present invention facilitates not only the purchase of physical goods, but also the purchase of digital merchandise (such as electronic information).

In one embodiment of the present invention, a client server on a client terminal controls the interaction with the consumer and interfaces to a card reader which accepts the consumer's smart card, which, in one specific embodiment, includes a stored-value application. For the purposes of this description, the smart card with a stored-value application used in embodiments of the invention will be simply referred to as a "stored-value card." A payment server on the Internet includes a computer and terminals that contain security cards to handle the transaction, data store and collection. Also connected to the client terminal and the payment server over the Internet is a merchant server advertising the goods and/or services offered by a merchant for sale. In one embodiment of the invention, the merchant server includes a web site and the merchant has contracted with an acquirer to accept stored-value card payments for goods and/or services purchased over the Internet. Thus, a consumer may use his or her stored-value card at a client terminal location in order to purchase goods and/or services from a remote merchant server. The Internet provides the routing functionality among the client terminal, merchant server and payment server.

From the consumer's perspective, the present invention operates in a similar fashion as using a stored-value card in a real merchant environment. The transaction process is similar to the interaction between a stored-value card and a service payment terminal in a face-to-face merchant environment, but with functionality distributed across the Internet between the card reading device located where the customer is, the merchant server advertising the merchant's wares, and a payment server with a security card that manages the transaction. All of these entities may be physically remote from one another with router functionality being provided by the Internet.

From the consumer's perspective, the present invention is easy to use. A consumer need not establish a new relationship with a bank or other Internet service company, nor create a special Internet deposit account in order to begin purchasing goods and/or services on the Internet. A consumer simply makes use of currently available stored-value cards in order to make an Internet purchase.

When browsing merchant store fronts on the Internet and deciding to purchase goods and/or services, the cardholder selects the stored-value card payment option offered by the merchant. The cardholder then inserts his or her card into a card reader attached to a personal computer (for example). The cardholder's balance and purchase amount are displayed, the cardholder approves the purchase, and the amount is deducted from the value stored on the stored-value card. The transaction amount is captured by the security card or the merchant server for subsequent batch settlement through a clearing and administration system to the issuer and acquirer. In one embodiment, the transaction security and authentication for the system follows a similar methodology as that used in an actual service payment terminal between a stored-value card and the security card in the terminal. Advantageously, a customer may make use of pre-existing stored-value cards for purchases over the Internet without any prior arrangement of an account, purchases of credits or tokens, or establishment of a new relationship with a bank or other company.

In addition, once a value has been deducted from the stored-value card, the merchant has been informed, and the security card in the payment server has recorded the transaction, an existing clearing and administration system may be used to reconcile the transaction and to pay the appropriate parties. Advantageously, a new system and methodology for reconciling transactions need not be developed or implemented. A pre-existing clearing and administration system may be used which greatly simplifies implementation of the present invention.

Use of a stored-value card as payment for Internet transactions provides numerous advantages. For example, a stored-value card can be used in small transactions where credit cards or checks would be unrealistic. Other advantages to the consumer include enhancing the value of a stored-value card by enabling access to both real and Internet merchant environments with a single card. The present invention also allows an anonymous payment solution for transactions over open networks. Furthermore, in one embodiment of the invention the stored-value card is implemented on a traditional credit card; a single card thus provides payment solutions for both low and high value transactions.

In addition, use of a stored-value card is extremely advantageous for small dollar amount transactions. Often, consumers are reluctant to use, and merchants are reluctant to accept, credit card transactions for small dollar amounts. For the consumer and the merchant dealing with many of these small transactions can be a bookkeeping headache and may not be worth the expense. A merchant may also be unlikely to accept a credit card for a small dollar amount transaction because of the service fees per transaction. By permitting the use of a stored-value card to make purchases over the Internet for small dollar amounts, a merchant may very well be able to begin charging for goods and/or services that he had been providing for free in the past. One embodiment of the invention works well with purchases of under $10.00, although purchases of any amount may be made.

The present invention also provides numerous advantages to merchants who wish to sell goods and/or services over the Internet. For example, the present invention provides a payment solution for low-value transactions, enabling merchants to offer a wider range of digital merchandise. A merchant is also provided a method to recover costs of services not previously charged for, and is provided immediate access to an existing, and rapidly growing, cardholder base. Furthermore, the present invention integrates into an existing clearing and administration system meaning that the merchant need not implement or become familiar with new procedures for reconciliation of transactions.

Furthermore, a merchant need only make a minimal investment in time and money to take advantage of the present invention and to accept payments over the Internet. The merchant need not engage in the development of complex software or accounting procedures. Thus, smaller merchants will especially benefit from the present invention. By establishing a business relationship with an acquirer and incorporating standard merchant software, a merchant is ready to begin selling goods and/or services from his web site. Because a smart card with a stored-value application is used, the payment server and the client terminal perform the details of the transaction and a merchant is relieved from having to control and keep track of a transaction. Also, the payment server and its associated security cards manage and provide security for the transaction. From a merchant's point of view, the merchant knows that a consumer desires to purchase an item and that a cost has been transmitted to the consumer, thus, when the merchant receives a confirmation message, the merchant may release the item to the consumer. The merchant need not be concerned about security nor be responsible for authenticating a stored-value card nor for determining a balance on the card. Of course, a payment server could coexist along with the merchant server or could even be the same computer. That is, a merchant could implement payment server functionality at its own site if it so desired.

The present invention also provides benefits to issuers and acquirers. Expansion of the functionality for a stored-value card increases revenue opportunities from cardholders and merchants. Also, there may be new merchant marketing opportunities for acquirers. The present invention also offers a micro-payment solution for electronic commerce without the need to introduce a separate product or brand or to establish new service provider relationships.

A further advantage of the present invention is its ability to minimize transaction traffic on the Internet and to minimize the amount of time that a security card is tied up with one transaction. By emulating security card commands issued to a stored-value card, a client terminal is able to receive and group responses for transmission to the payment server all at once, rather than one-by-one over the Internet. The payment server is then able to emulate a stored-value card as it interacts with the security card in delivering the responses to the security card. The result is less message traffic over the Internet, saving time and interrupts.

Also, by delivering an expected stored-value card signature to the payment server, the security card is relieved from having to compare the signatures itself, and may release sooner and move on to a new transaction. The payment server may also deliver the expected stored-value card signature to the client terminal or merchant server for comparison, thus reducing to one round trip the message traffic between the payment server and the client terminal.

The present invention is suitable for use with any type of stored-value card that is able to store an amount and to decrement a value upon a command. In one embodiment of the invention, a stored-value card implemented as a processor card works well. Use of a processor card has advantages where information processing is done on the card rather than in the terminal or host computer. Processor cards allow encryption to be done by the card, allow generation of signatures, and can accommodate multiple passwords or personal identification (such as biometrics that uniquely identify the holder of the card). Processor cards also provide increased data security, an anti-fraud capability, flexibility in applications, a multi-purpose capability, and off-line validation. Because high telecommunication costs and/or low reliability of a network may make on-line authorization impractical, a stored-value card with the capability for performing off-line processing and authentication by itself is extremely valuable.

In another embodiment of the present invention, a consumer may wish to access any of a variety of Web servers in order to redeem frequent flyer miles, award points, etc., that he or she has accumulated. In this embodiment, a consumer has accumulated points through any of a variety of programs with airlines, restaurants, rental car companies, hotels, banks, credit or debit card issuers, telephone or other communication companies, etc. The consumer wishes to redeem these points to receive free airline tickets, meals, car rental, overnight stays, prizes, awards, discounts, or other benefits. By accessing a Web server associated with the particular program, the consumer is able to use his or her stored-value card in any of the embodiments described herein to authenticate the card and to receive the benefits of the program.

For example, a consumer with 30,000 frequent flyer miles on one airline may use this embodiment of the present invention to access a Web server associated with the airline. The consumer is requesting a free round-trip ticket in exchange for 20,000 miles. The present invention then operates to authenticate the consumer's stored-value card, and delivers a confirmation of authentication message to the Web server for the airline. The Web server then deducts 20,000 miles from the consumer's account (leaving 10,000 miles) and delivers the free ticket to the consumer. In one specific embodiment, the Web server associated with the airline (or the airline itself) keeps track of the consumer's account and deducts the mileage. In another specific embodiment, the consumer's stored-value card stores the consumer's accumulated frequent flyer mileage; the mileage from the card is then debited and confirmed to the Web server in a similar fashion as described in various of the embodiments by which a cash value is stored on and debited from a card.

BRIEF DESCRIPTION OF THE DRAWINGS

The invention, together with further advantages thereof, may best be understood by reference to the following description taken in conjunction with the accompanying drawings in which:

FIG. 10 is a flowchart describing a user's perspective of a stored-value card transaction using the present invention.

FIGS. 11A–11D are a flowchart describing the processing of a user purchase using an embodiment of the present invention.

DETAILED DESCRIPTION OF THE INVENTION GENERAL ARCHITECTURE

Figure 1:
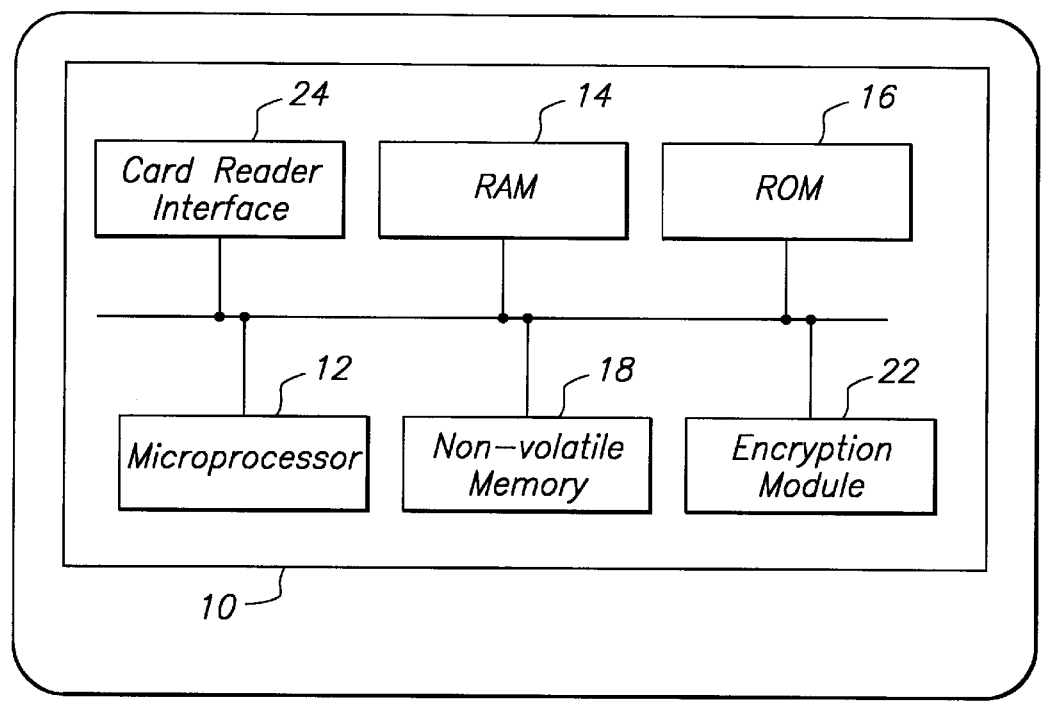
FIG. 1 is a block diagram of an example of a stored-value card useful in embodiments of the present invention.
Figure 2:
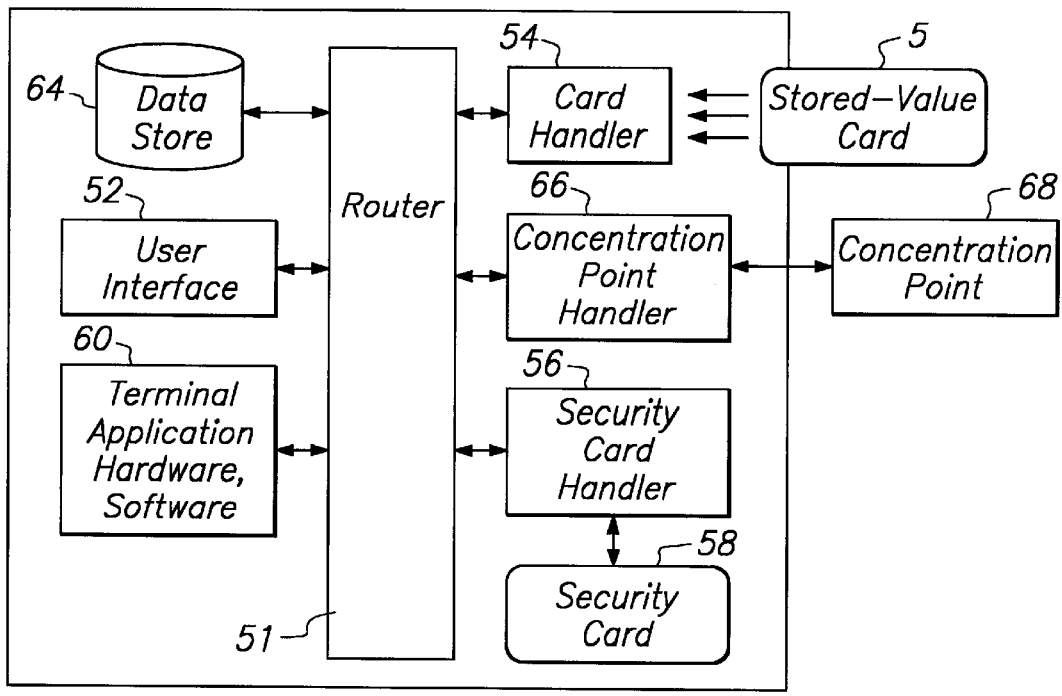
FIG. 2 is a block diagram of a service payment terminal in which a stored-value card may be inserted to purchase merchandise.
Figure 3:
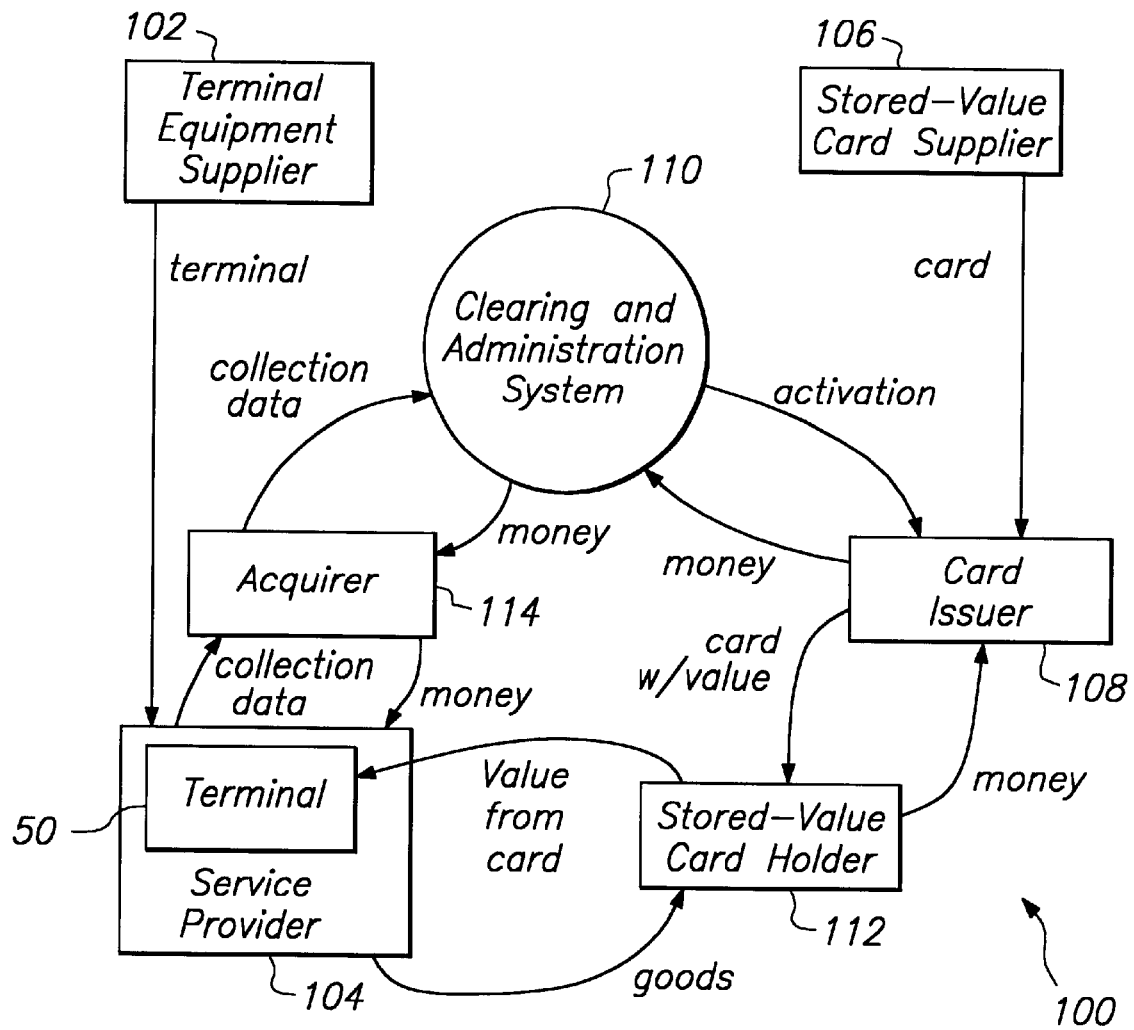
FIG. 3 is a block diagram of an example of a clearing and administration system useful for reconciling financial transactions received from a service payment terminal.
Figure 4:
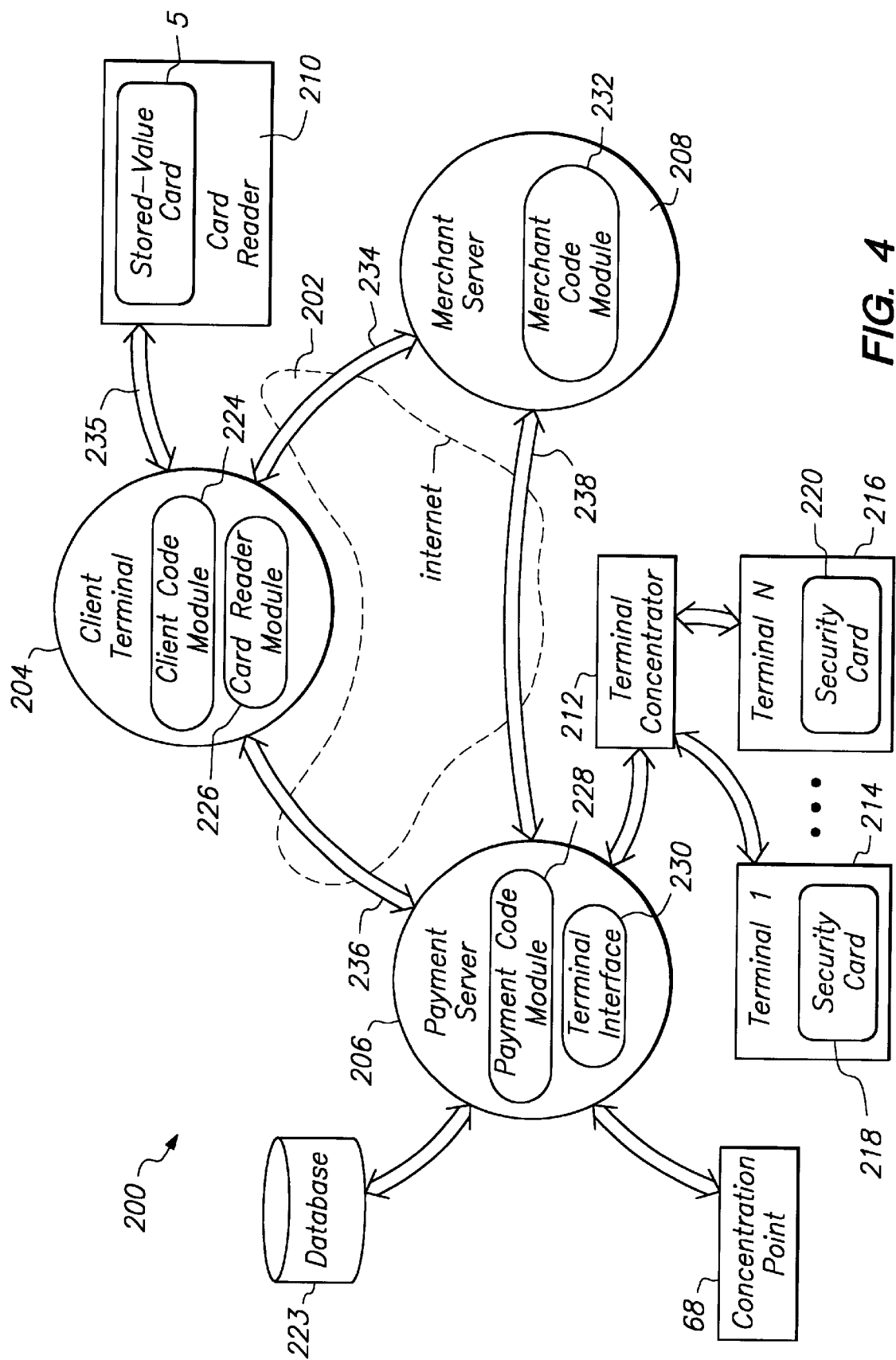
FIG. 4 illustrates an architecture and system for payment over the Internet using a stored-value card.

The present invention separates the functionality involved in a transaction using a stored-value card in order to take advantage of the routing capabilities of the Internet. FIG. 4 illustrates symbolically an architecture 200 for an internet payment system involving a smart card, such as a smart card having a stored-value capability. Shown is an internet 202, a client terminal 204, a payment server 206 and a merchant server 208. Local cardholder functions including a consumer card interface, display and accept/cancel options are performed at client terminal 204. Payment functions including security card control, data store and use of a concentration point are performed by payment server 206. The presentation and eventual delivery of goods and/or services by a merchant are performed under control of merchant server 208. The internet 202 performs routing functions between each entity. It should be appreciated that internet 202 may take the form of the Internet currently in use, or may also be any other open network implemented using any combination of computer, telephone, microwave, satellite, and/or cable networks.

Basically, client terminal 204 controls the interaction with a user and interfaces to card reader 210 which accepts a smart card having a stored-value application. For simplicity, throughout the remainder of this specification, card 5 will be referred to as a stored-value card (SVC) 5. Payment server 206 communicates directly with a terminal or through a concentrator 212 that handles any number of terminals 214–216 each having a security card 218 and 220 respectively. Payment server 206 also communicates with concentration point 68 for transmission of transaction data to a clearing and administration system. Payment server 206 controls payment functions such as handling the attached terminals, managing data base 223 and collection functions. Merchant server 208 is a site that has contracted with an acquirer to accept stored-value card transactions as payments for goods and/or services purchased over the Internet.

Stored-value card 5 may take a variety of forms and is useful in many situations where it is desirable to store monetary value on a card that a consumer may use. In general, a stored-value card is any card or similar device that is able to store a value that is decremented when the card is used. The card may be purchased complete with a stored-value or value may be later added to the card by a user. Such cards may also have their value replenished. Of course, a stored-value card need not be in the form of the traditional credit card, but could appear in any form and of any material that is able to store value and be manipulated by a user for a payment transaction. By way of example, other forms that a stored-value card may take are any electronic representations. Further, the functionality of stored-value card 5 may be implemented in software on client terminal 204, that is, card 5 may be a "virtual" card.

A stored-value card may also perform a variety of functions in addition to simply storing value. A card may be dedicated to the storing value or may contain memory and programs for other applications as well. By way of example, an "electronic wallet" refers to a processor card that can execute a variety of financial transactions and identification functions. Such a card may serve debit, credit, prepayment, and other functions. A stored-value card typically includes information such as a bank identifier number, a sequence number, a purchase key, a load key, an update key, an expiration date, a transaction counter, a session key, etc., in addition to a running balance.

A stored-value card may also be termed a prepayment card, a cash card, or a decrement-in-value card. A stored-value card may also be implemented by using a variety of card technologies. By way of example, a stored-value card is typically implemented as a card containing one or more integrated circuits. One example of an integrated circuit card is a memory card that has a semiconductor device for storing information but lacks calculating capability. Another example of an integrated circuit card is a processor card that has not only memory but also a microcontroller to enable the card to make decision. A processor card may also be termed a microprocessor card or a "smart card".

A processor card may include an encryption module in order to provide a variety of security precautions. By way of example, security precautions may include simple PIN numbers, biometrics, simple algorithms, or sophisticated algorithms such as the Data Encryption Standard (DES) or Rivest, Shamir, Adelman (RSA) encryption. The card is thus able to use these precautions to verify users, card readers, etc., to validate security cards and/or to provide a unique signature.

Security card 220 (which may also be referred to as a Purchase Secure Application Module—PSAM) contains a microchip embedded in the card that enables the security card to authenticate and to validate the user's stored-value card. If a user stored-value card is accepted by the security card, and the stored-value card contains sufficient value, the security card guarantees that the merchant providing the goods and/or services receives payment according to the amount deducted from the stored-value card for the goods and/or services rendered. In a currently-preferred embodiment, the security card also contains DES purchase security keys and authenticates the stored-value card during a purchase transaction and secures the payment and collection totals. A security card may also contain a transaction identifier for the current transaction, a financial sum of all transactions remaining to be settled, a session key, and master keys for all stored-value cards in use. Further, the security card may contain generations of keys, blocked card indicators, date of last update, multiple card programs, different currency rates and additional security.

Client terminal 204 is any suitable device for interacting with a stored-valued card 5 and for communicating over a network to a payment server or a merchant server. By way of example, client terminal 204 may be a mainframe computer, a work station, a personal computer, a kiosk, or any type of service payment terminal that a consumer might use to purchase goods and/or services. Furthermore, client terminal 204 may also be embodied in any portable device such as a laptop computer, a cellular telephone, or any variety of a personal digital assistant (PDA) such as those made by Apple Computer, Inc. or by U.S. Robotics. Card reader 210 is any suitable interface device that functions to transfer information and commands between client terminal 204 and stored-value card 5. By way of example, card reader 210 may be a card reader manufactured by Fischer-Farr International of Naples, Fla., by Hewlett-Packard of Palo Alto, Calif., by Schlumberger, by Gem Plus, etc. Card reader 210 may take any variety of forms such as a stand alone unit, integrated with the client terminal, attached to the keyboard of the client terminal, or even built in to a floppy disk-sized unit capable of being read from a disk drive of the client terminal, etc.

Client terminal 204 includes client code module 224 and card reader module 226. Reader module 226 may be implemented using any suitable software and libraries for communicating with card reader 210 and its actual implementation will depend upon the type of card reader used. Client module 224 controls communication between the client terminal, the card reader, the payment server and the merchant server. Client module 224 may be implemented using any suitable code. In one embodiment of the invention, client module 224 is implemented using a combination of "C" code and a Java applet. The applet is also supplemented with parameters from an HTML page sent from the merchant server. It is contemplated that Java code works well for implementing the modules on the client, payment and merchant servers because it is platform independent, and could even replace the "C" and "C++" code used.

Client module 224 is also responsible for controlling displays to the user and for the interaction between the card and the card reader. The module also builds the draw request message after receiving all of the start-up information from the card and the amount of the purchase from the merchant server. The client module is able to communicate with all components on the Internet, either directly or indirectly.

Payment server 206 includes payment code module 228 and terminal interface 230. As with client terminal 204, payment server 206 may be implemented using any suitable computer. By way of example, a personal computer works well. There may be one payment server for each merchant server or a single payment server may service any number of merchant servers. Alternatively, there may be multiple payment servers for a single merchant. In addition, payment server 206 need not be remote from merchant server 208 but may be located at the same site and have a different Internet address, or the payment server and the merchant server may even be implemented on the same computer. Payment server 206 is designed to facilitate the communication between the user's stored-value card and a terminal's security card. If a part of a transaction fails to complete, the payment server may notify the participating system components.

Payment module 228 may be implemented using any suitable code. By way of example, payment module 228 is implemented using a combination of "C" code, "C++" code and Java code. Payment module 228 is, in one specific embodiment, a multi-threaded process that can service multiple concurrent client applet transactions on demand. The module is responsible for controlling all interactions with the terminals and their concentrator including the transaction collection function. For individual transactions, the payment module controls the message flows and logs interim results. When an applet connects with the payment server, it creates a transaction thread to support the transaction through its life cycle. Each thread, in turn, assigns a terminal for communication. Having a one-to-one correspondence between transaction threads and terminals has been found to provide desirable results.

Terminal interface 230 is any suitable set of software and libraries for communicating with a terminal 214 either directly or, as shown, through terminal concentrator 212. The actual implementation of terminal interface 230 will depend upon the type of terminal used. A terminal such as 214 may be any suitable terminal such as are known in the art. By way of example, an iq Delta 2010 terminal made by Schlumberger has been found to provide desirable results. Such a terminal may support a variety of commands originating from the terminal interface. These commands emulate the normal responses that an attached terminal would pass from the stored-value card to the security card. The actual security card commands are held in the terminal while the terminal performs the tasks necessary to simulate the presence of a stored-value card.

A security card such as security card 218 may be any suitable security card such as are known in the art. By way of example, security card 218 may be a removable credit card-sized processor card that is programmed to process and store data relating to financial transactions. A security card also stores signature algorithm and keys for all stored-value cards in use. In other embodiments, the functionality of security card 218 could be replaced by a hardware security module implemented at the payment server, or could even be implemented in software.

Concentration point 68 is a staging computer that communicates with terminals to collect batches of purchase transactions. The concentration point then sends these transaction batches to a clearing and administration system for processing. Once processed, batch acknowledgments, along with other system updates, are sent back to the terminals via the concentration point.

Merchant server 208 includes a merchant code module 232. Merchant server 208 may be implemented upon any suitable computer capable of communicating with and presenting information to users over an internet. Merchant code module 232 may be implemented using any suitable code. By way of example, merchant module 232 may be implemented using a combination of Perl, HTML, and Java code. Merchant server 208 is typically a generic web server customized for the merchant's business. Merchant server 208 may include databases, CGI scripts and back-office programs that produce HTML pages for an Internet user.

A brief discussion of the flow of a transaction now follows. During a financial transaction, the client terminal and merchant server exchange information 234 via internet 202. Each transaction initiated by a user has a transaction identifier created at the merchant server, and a merchant identifier unique to the payment server is also available from the merchant server. Client module 224 and the payment server also use this unique transaction identifier for tracking and logging information about the transaction. Merchant server 208 generates a unique identification of the transaction, completes other required parameters, encrypts as appropriate, and builds an HTML page and sends it to the client terminal. The client module interacts 235 with the stored-value card and builds a draw request message containing related card information, the purchase amount, and other information supplied by the merchant server.

The client terminal then communicates 236 with payment server 206, first by forwarding the draw request to the payment server. Payment server 206 verifies the transaction to determine if it is a valid transaction from a known merchant. The transaction is logged into the payment server's transaction database 223. Upon completion of a transaction, payment server 206 builds a result message containing the identification of the transaction and signs it. The message is then routed to merchant server 208 via client terminal 204. Merchant server 208 then validates the result message. After determining that the transaction was successful, merchant server 208 creates an HTML page for the purchased information and sends it to client terminal 204. Alternatively, the merchant may also deliver purchased goods to the user at this point. It is also possible for the payment server and the merchant server to communicate information 238 directly between themselves. Preferably, as client terminal 204 has already established communication with the merchant server and the payment server, links 234 and 236 are used to exchange information between the payment server and the merchant server, rather than establishing a new link 238.

User Perspective of a Transaction

FIG. 10 is a flowchart describing an embodiment of the present invention from a user's perspective such as may occur with the embodiment of the invention shown in FIG. 4. In step 502, a user acquires and adds value to a stored-value card. Alternatively, a user may acquire a stored-value card that already contains value. This stored-value card may take the form of any of the above-described stored-value cards that are able to store value and to debit value from the card. In step 504 the user accesses the merchant server web site via communication link 234 over the Internet. This access of a web site may be performed in any suitable fashion such as by using any commercially available web browser. In step 506 the user inserts a stored-value card in card reader 210 at the user's terminal. Alternatively, the user may insert the card before accessing the web site, or even after the selection of goods and/or services from the merchant web site. In step 508 the user browses the merchant web site and selects goods and/or services for purchase from the merchant using the web site interface that the merchant has provided. The user then selects an appropriate button on the merchant web site to indicate what the user wishes to purchase. Next, in step 510 the user receives a total sale amount from the merchant server and is directed to actuate a button on the web site indicating that the user wishes to proceed with the purchase using the stored-value card.

In step 512 the architecture and system of the present invention (such as is shown in FIG. 4, for example) processes the user order by way of the payment server, terminal and security card. In step 514, the user's stored-value card is debited by the total sale amount and the user receives a "debited" message at the user's terminal. This message is optional if the system is designed so as to not inform the user of this debit. In step 516 the user receives a confirmation message from the merchant server indicating that the transaction has been completed. The user may now download the purchased information and/or receive a receipt for goods and/or services to be rendered or delivered from the merchant at a later date. In step 518 the merchant, via a clearing and administration system, receives payment to its bank account for the goods and/or services rendered by way of information collected from the payment server. In one embodiment of the invention, an existing clearing and administration system is used, as well as an existing methodology for transferring information from a security card for later reconciliation. This use of an existing "back end" allows systems of the invention to be implemented quickly and cheaply. This approach also ensures that cards used in the system are compatible with other stored-value terminals.

Detailed Transaction Flow

Figure 5:
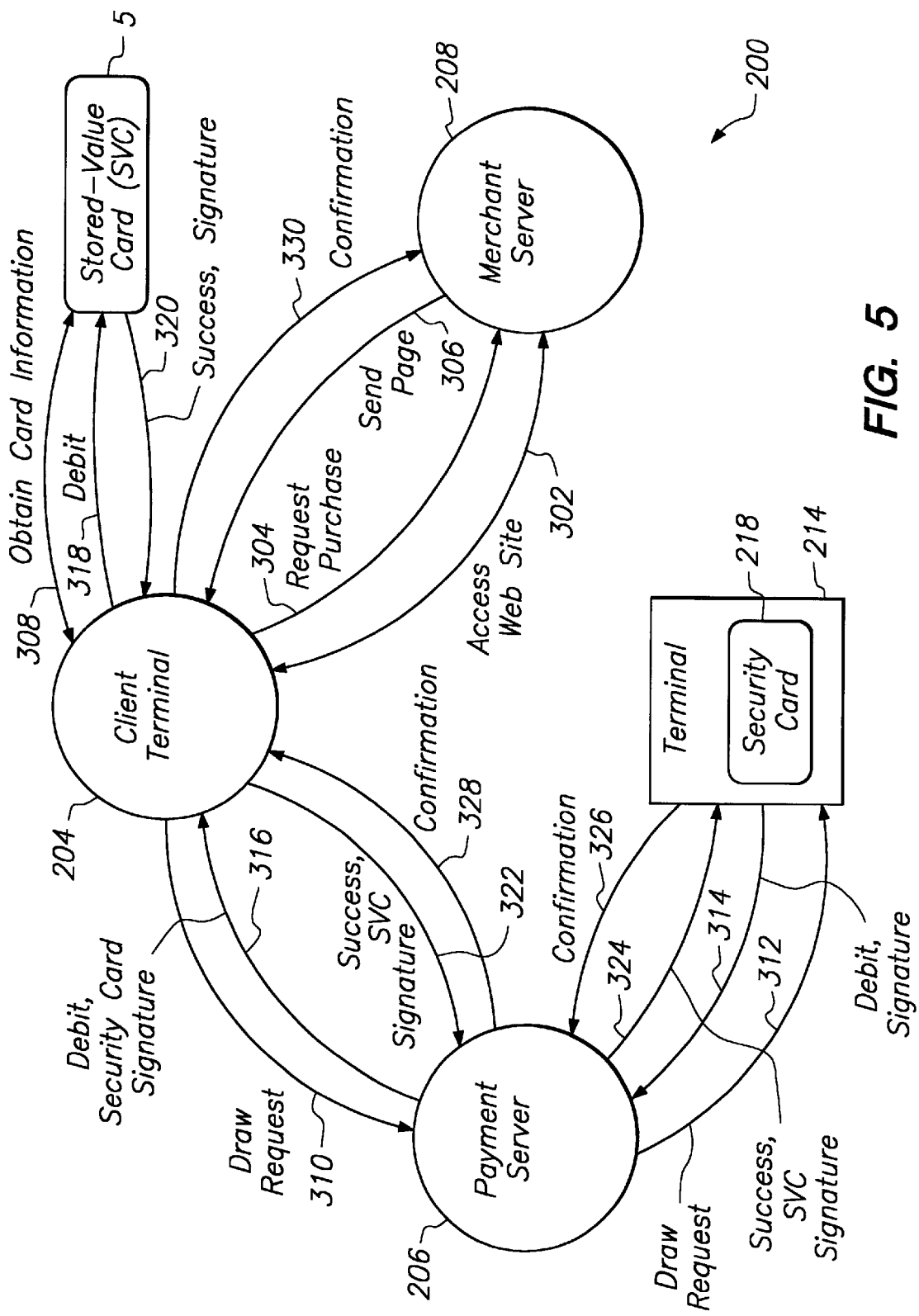
FIG. 5 illustrates an embodiment of the present invention.

FIG. 5 illustrates a detailed embodiment of internet payment architecture 200 having client terminal 204, payment server 206 and merchant server 208. A stored-value card 5 is in communication with client terminal 204, and a security card 218 inside a terminal 214 is in communication with payment server 206. Not shown for simplicity in this figure are other elements of the system shown in FIG. 4. One embodiment of a technique by which a financial transaction may be completed over the Internet will now be described using the flowcharts of FIGS. 11A through 11D with reference to FIG. 5.

It should be appreciated that a wide variety of terminology may be used to describe message flow throughout the architecture. For example, the terminology used herein to describe the sequential messages draw request, debit, success, and confirmation, may also be referred to by the respective terminology: draw request, debit IEP, debit response, and debit result (or message result).

Initially, a suitable web browser of client terminal 204 is used by the user to access a merchant server web site as indicated by 302. In step 602, the user selects goods and/or services from the merchant site and indicates to the site that the user wishes to purchase these items using a stored-value card as indicated at 304. In step 604 the merchant server receives this request for a stored-value card transaction.

In step 606 the merchant server builds an HTML page that includes the following client applet parameters: the total cost of the transaction as determined by the merchant server; the type of currency being used; the port and IP address of the payment server; a unique transaction identifier used by both the payment server and the merchant server to track a transaction; and a unique merchant identifier assigned to the merchant by the acquirer and known to the payment server. Other information may also be included such as the currency's exponent, a status URL address of the merchant server used for communication from the client terminal, and a merchant server generated key and other security information to ensure the identity of the merchant server and the integrity of the message. Other process related information such as software release level, encryption methodology and keys may also be conveyed. Once this page has been built, the page is sent 306 to the requesting client browser and triggers the loading of the client code module (in this example a Java applet) in the client terminal.

Some browsers may not allow an applet to invoke a dynamic link library (DLL) due to security reasons. In an embodiment of the present invention, the client applet along with any DLLs needed are preloaded on the client terminal. Then, the merchant server is allowed to invoke the client applet and DLLs dynamically to circumvent this security precaution.

In step 608 the client module of the client terminal interacts with stored-value card 5 to obtain card information 308 in order to build a draw request message for later transmission 310 to payment server 206. In one embodiment of the invention, the client applet loads a local DLL, makes an API call to that library, which in turn makes a call to another DLL that finally makes a call to the card reader. In this fashion communication with the card is achieved. Once responses from the card are received, the client module will also combine these responses into a byte stream suitable for transmission over a network to a payment server. Also at this point, the currency type and expiration date on the card are checked, and the total cost of the ordered merchandise is checked against the card balance to ensure that the value on the card is great enough to cover the transaction. If the checks are not successful, a message to that effect is delivered to the user and this transaction terminates.

The client module emulates a variety of security card commands to receive responses from these commands from the stored-value card. Because the stored-value card and the security card are now physically separated from one another, and communication takes place over the Internet, it would not be advantageous to engage in numerous commands and responses over such an open network. In the interest of speed and reliability, it is advantageous to have fewer messages exchanged.

To operate securely and reliably in this environment, in one embodiment of the present invention, client module 224 emulates a security card and gathers all the responses for transmission in one draw request message. The draw request message may include a variety of information including a draw request token, state information, the merchant identifier, the transaction identifier, security information, a purse provider identifier, an intersector electronic purse (IEP) identifier, an algorithm used by the card, an expiry date, the balance of the card, a currency code, a currency exponent, the authentication mode of the IEP, the transaction number of the IEP, a key version and the purchase amount. As all of this information is prepackaged into a single draw request message, the number of messages between the stored-value card and the security card over the Internet is greatly reduced.

In this embodiment, the draw request message is built by packaging the stored-value card's response to the "reset" and "initialize" commands and any public key certificates along with the total cost and the currency of the transaction received from the HTML page. For public key cards, the card and issuer certificates are obtained from read commands and may also be included in the draw request. By packaging all of this information together into one draw request message, it is possible to cut down on the number of messages exchanged between the client server and the payment server, and reliability and speed is improved. In one embodiment of the invention, an intersector electronic purse (IEP) protocol is used to reset and initialize the card and to receive a response.

Next, in step 610 the client terminal accesses the payment server using the IP address received from the merchant server. In step 612 the client terminal sends the draw request message to the payment server as indicated at 310. The client terminal also creates a log of this message being sent.

In step 614 the payment server processes the draw request in conjunction with an associated security card as will be explained in greater detail below with reference to FIG. 11D. Draw request 312 is shown being sent to terminal 214. In one embodiment of the invention, the payment server creates a transaction thread for each connected client module to service it through the life cycle of the transaction. After step 614, the payment server has received a debit command and a security card signature 314 from the security card in the terminal. This debit command may also be termed a "debit IEP" command. The security card signature is a value that uniquely identifies and validates security card 218 to prove to stored-value card 5 that the incoming debit command is a valid command from a real security card. This validation ensures that when the stored-value card is debited, that the financial totals in the security card are updated. Thus, the user of the stored-value card is guaranteed that a valid debit of the card has occurred. In a preferred embodiment of the invention, the security card signature is an encrypted value ensuring that no other entity can forge an identity of a security card.

In step 616 the payment server sends the debit command along with the security card signature to the client terminal as indicated at 316 for the stored-value card to debit itself. At this time, the payment server also logs this debit command into its database.

In step 618, upon receiving the debit command from the payment server, the client module replaces the amount in the debit command with the original amount (from the merchant server) to ensure that the amount has not been tampered with while traveling over the network. At this time, the client module also creates a log of the debit command. Client module 224 then passes 318 the debit command and security card signature to stored-value card 5 which verifies the signature, debits itself by the purchase amount, and also generates a success message (also termed a "debit response" message) and a stored-value card signature. The stored-value card signature is a unique value identifying a valid stored-value card. In a preferred embodiment of the invention, this signature is in encrypted form to prevent tampering. If card 5 does not have enough value to satisfy the purchase amount, then the "debit response" message indicates as such.

In step 620, card 5 sends a success message 320 along with the card signature back to client module 224 in client terminal 204. This success message may also be termed a "debit response" message. At this point, the purchase amount has been deducted from the balance on stored-value card 5. Next, in step 622, client module 224 packages the success message along with the card signature and sends them back to payment server 206 as indicated at 322. Client module 224 also logs the result of this stored-value card debit.

In step 624 the payment server receives incoming message 322 and creates a log and updates the transaction status in its database for future error recovery. The payment server then directs this received message to the security card in the terminal as indicated at 324. Next, in step 626 the security card processes this response from the client's terminal and verifies the received stored-value card signature.

As the security card contains the keys and algorithms necessary to compute stored-value card signatures, the security card is able to validate that a received stored-value card signature is in fact a valid one by comparing this stored-value card signature with a generated expected value. A successful comparison indicates that a success message 324 received from the stored-value card is in fact a valid success message and that the stored-value card has been debited. An error result code or a comparison that is not successful potentially indicates that the stored-value card has not been debited by the proper amount. This comparison of stored-value card signatures by the security card ensures that a stored-value card is in fact debited before the merchant server is directed to release the purchased merchandise. This comparison of the stored-value card signature to an expected value is performed by the security card for the highest level of security. As will be described in the embodiments of FIG. 6, 7, and 8, this comparison of stored-value card signatures may also take place in the payment server, in the client terminal or in the merchant server with a variety of other advantages. Assuming that the transaction is so far valid, in step 628 the security card sends a "confirmation" message back to the payment server as indicated at 326. This confirmation message may also be termed a "message result."

In step 630 the terminal updates its data store with the stored-value card number, a transaction count, the total sale amount, the response from the security card, and transaction numbers from the stored-value card and from the security card. The payment server also logs the response received from the terminal including the merchant identifier, etc., as indicated in step 632. Next, in step 634, the payment server creates a confirmation message including the transaction identifiers and sends this message to the client terminal in encrypted form as indicated at 328. This message 328 may also be termed a "message result."

Figure 15A:
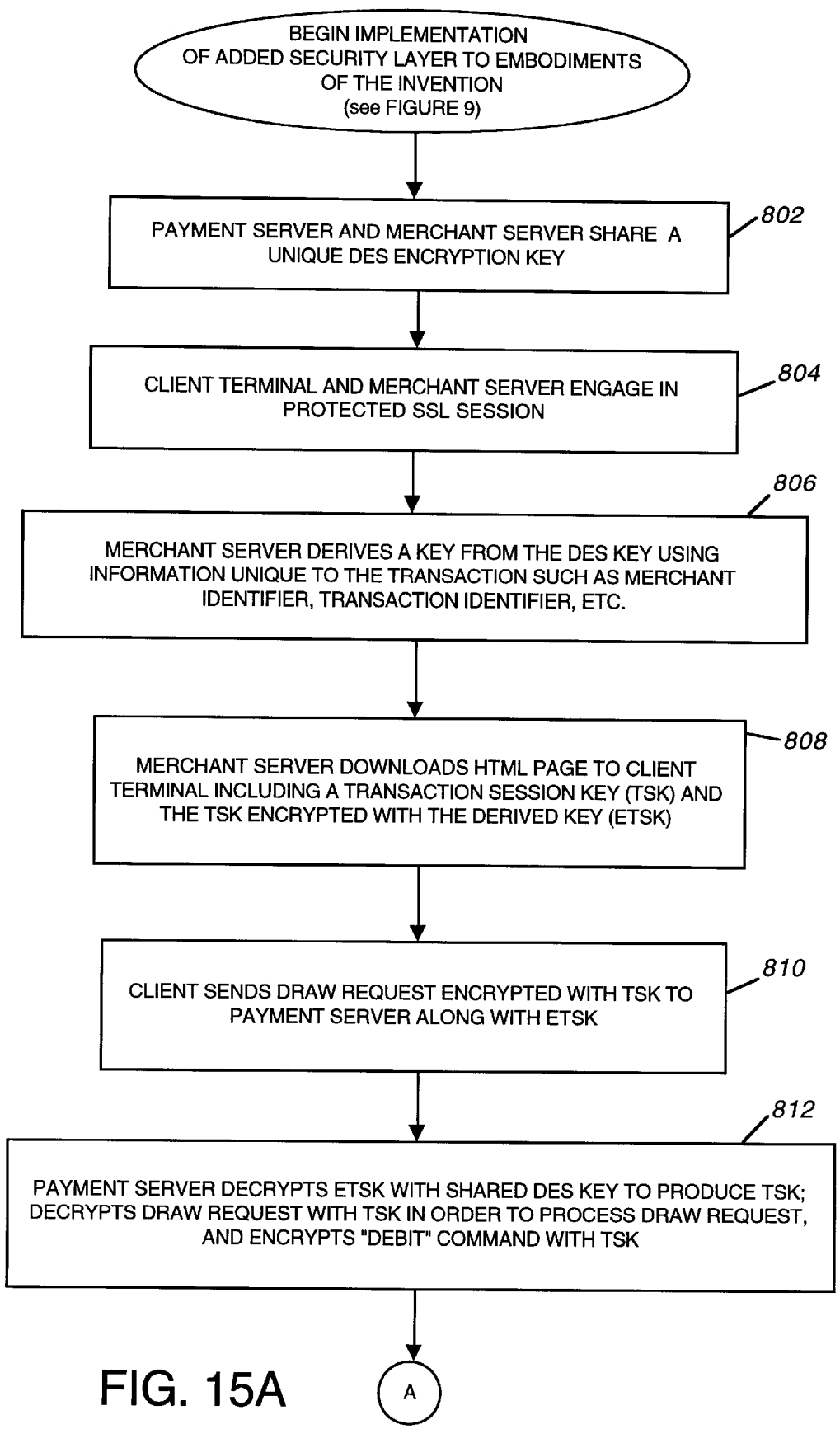
FIGS. 15A and 15B are a flowchart describing the added security layer of FIG. 9.
Figure 15B:
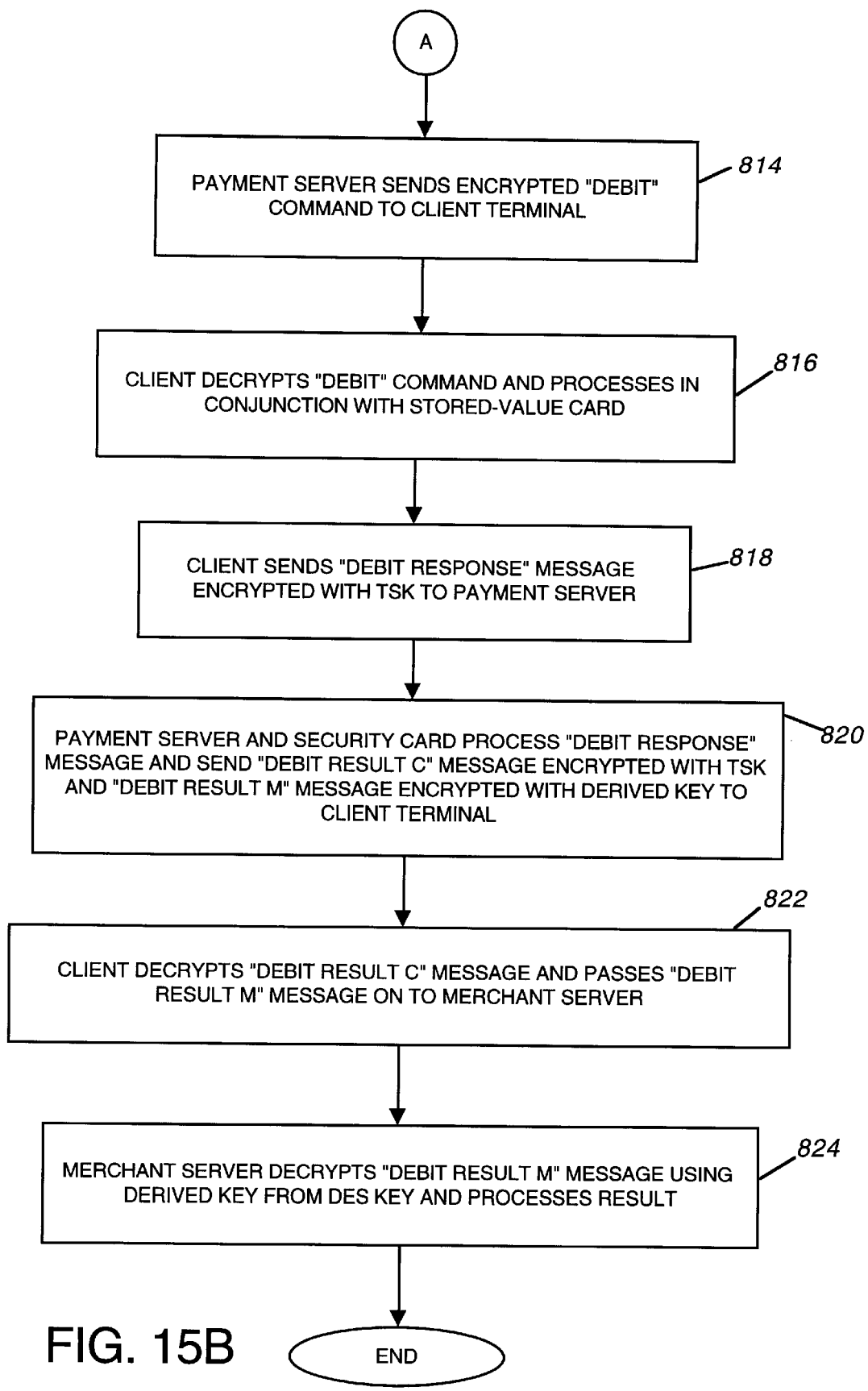

By sending this confirmation message in encrypted form, the confirmation message may be passed to the merchant server by way of the client terminal without fear of tampering. As the confirmation message is encrypted, it would be extremely difficult for the client terminal or another entity to forge a confirmation message and trick the merchant server into thinking that a transaction had taken place. In another embodiment of the invention, if the client terminal is a trusted agent, then the confirmation message need not be encrypted. In yet another embodiment, the payment server may sent two confirmation messages, one not encrypted for the client to process, and one encrypted for the merchant server. FIGS. 15A and 15B present an embodiment in which the payment server sends two messages to the client terminal.

At this point, the transaction thread of the payment server that was used for the current transaction may release the terminal, thus allowing the terminal to be used by other transactions. This transaction thread then exits at this time.

In step 636 the client terminal then passes this confirmation message 330 on to the merchant server at the URL address previously received from the merchant server. Message 330 may also be termed a "message result." The client may also post a message to the user informing that the debit has been completed. The client also logs confirmation of the payment. In step 638 the merchant server registers this confirmation message and checks for success. The merchant server calls a validate routine within the merchant code module with the confirmation message in order to validate the response from the client. The validate routine is able to take the transaction identifier along with the encrypted confirmation message to decrypt the confirmation message. If the decrypted confirmation message is acceptable, the merchant server then determines a successful transaction has occurred. Next, in step 640 the merchant server generates an HTML page with the purchased information and delivers this information to the client terminal. Alternatively, the merchant server may generate a purchase receipt to deliver to the client terminal indicating goods and/or services to be rendered. At this point, the client terminal may also log the merchant server's response. Completion of these steps indicates a successful financial transaction over the Internet using a stored-value card.

Returning now to a more detailed discussion of step 614, FIG. 11D describes one technique for processing a draw request message in conjunction with a security card. Once this draw request message has been received by the payment server and passed along to the terminal, the terminal parses the message back into individual responses and passes these responses sequentially to the security card as will be explained below.

In step 680 the payment code module of the payment server edits the draw request for syntactic correctness and logs the draw request message as being received. In step 682 the draw request is passed to the terminal interface module of the payment server. In one specific embodiment, the terminal interface then requests a terminal from the payment server's terminal pool. The payment server has a pool of terminals connected to the terminal concentrator that is established at start-up. At start-up, the payment server receives a list of all valid terminal identifiers. The payment server uses these identifiers, and its knowledge of transactions in progress to determine an appropriate terminal to process the transaction. Once a terminal is determined, the terminal interface builds a terminal specific message based upon the draw request and the type of terminal.

In step 686 the terminal specific draw request 312 is sent to the chosen terminal via the concentrator over a local area network. The concentrator acts as a router between a transaction thread in the payment server and its corresponding terminal. The concentrator looks at a header on the draw request to determine to which terminal the transaction should be routed. In one embodiment of the invention, concentrator 212 is removed and payment server 206 communicates directly with terminal 214 (for example).

In step 688 the terminal parses the draw request message into its various components and processes each component in turn to emulate a stored-value card interacting with the security card in a physical terminal. Prepackaging of a variety of information into the draw request message results in fewer exchanges over the Internet between the client terminal and the payment server. By now simulating an interaction, the security card behaves as if it were in a physical terminal along with the stored-value card. A variety of responses from a stored-value card may be emulated. In this embodiment, the terminal sends each of the three packages "answer to reset", "initialize IEP", and "debit" down to the security card individually and waits for a return message before sending the next response. For a public key transaction, the certificates read by the client are also included as individual responses. In this fashion, even though all of the stored-value card information (the draw request) originating from the client terminal has been sent at once in prepackaged form over the Internet, the traditional interaction between the stored-value card and the security card in a physical terminal may be simulated at the terminal in a remote location.

In step 690 the terminal reaches a "draw amount" state, indicating that the security card is able to generate a debit command. In step 692, the security card generates its security card signature and the debit command. The debit command may also be termed a "debit EEP" commnand. This signature and debit command 314 are sent to the terminal. The debit command issued by the security card may contain a wide variety of information including the security card identifier, the transaction identifier, the amount to be debited, the currency and currency exponent for the amount, the security card signature, the date, time, and location. The terminal in turn, sends the signature, command, and the terminal identifier to the payment server as indicated in step 694. The information may be sent to the payment server as indicated at 314 via a concentrator. At this point, step 614 ends and control returns to step 616.

First Alternative Embodiment

Figure 6:
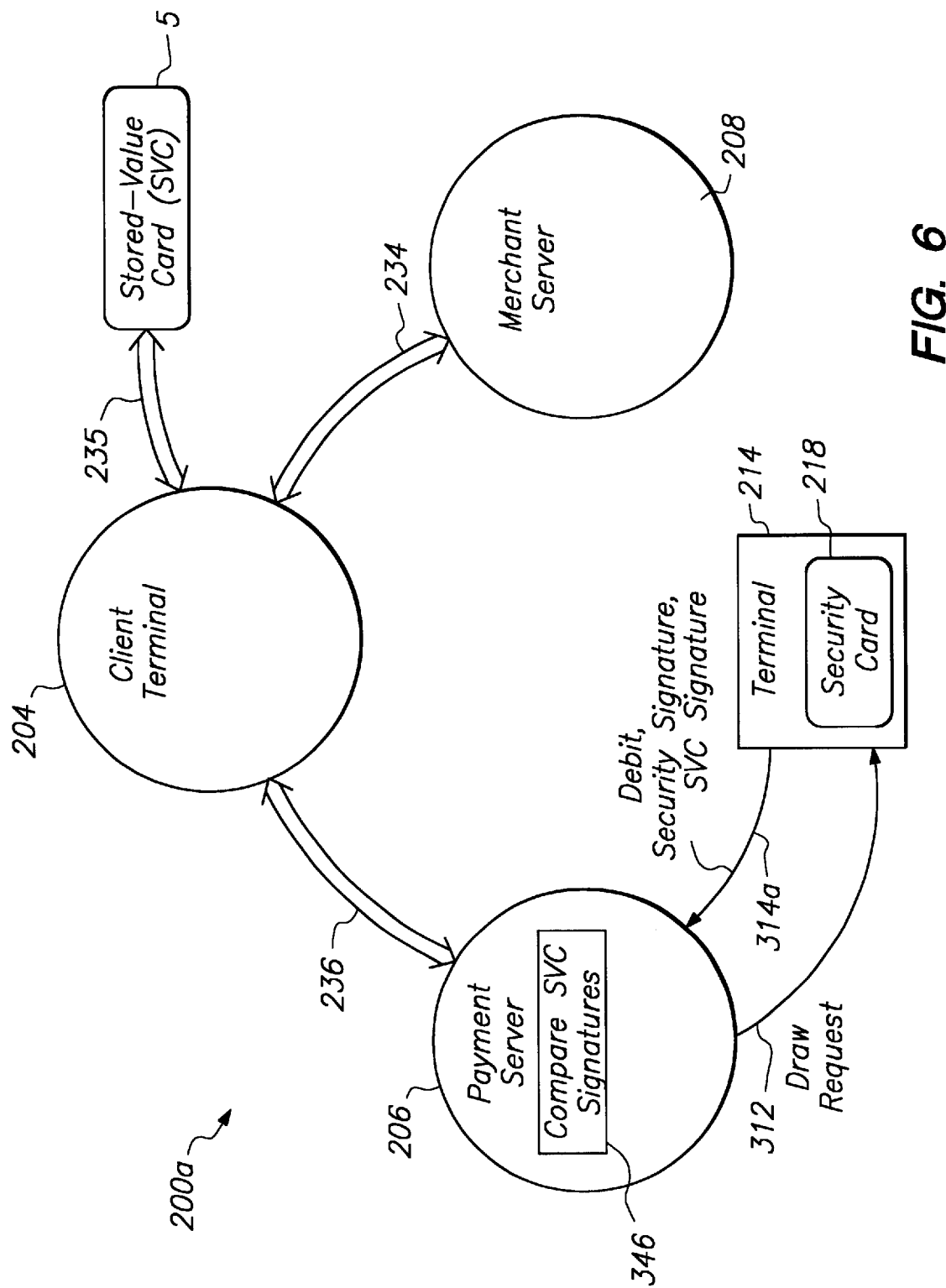
FIG. 6 illustrates another embodiment of the present invention in which the security card releases earlier.

FIG. 6 illustrates an alternative embodiment 200a in which the security card is able to be released sooner than the security card of FIG. 5; this embodiment also requires fewer exchanges between the terminal and the payment server. A security card in a terminal is dedicated to a particular transaction from the moment when the terminal interface selects that terminal until the security card finally issues a "confirmation" message and is released by a terminal interface. Thus, in some circumstances it is desirable to release the security card earlier. By releasing a security card earlier, the card is tied up for a shorter time per transaction and may move on to the next transaction sooner. Also, the less time that a terminal is dedicated to a particular transaction, and the fewer messages exchanged between the two, the less likely chance there is of a communication error that might interrupt and halt the transaction.

Embodiment 200a includes a client terminal 204, a payment server 206, a merchant server 208, a stored-value card 5, and a terminal 214 having a security card 218. Communication between the various entities may take place in a similar fashion as in FIG. 5 as indicated by communication links 234, 235, and 236. However, instead of two round trips of information between the terminal and payment server, there is only one round trip in this embodiment.

Figure 12:
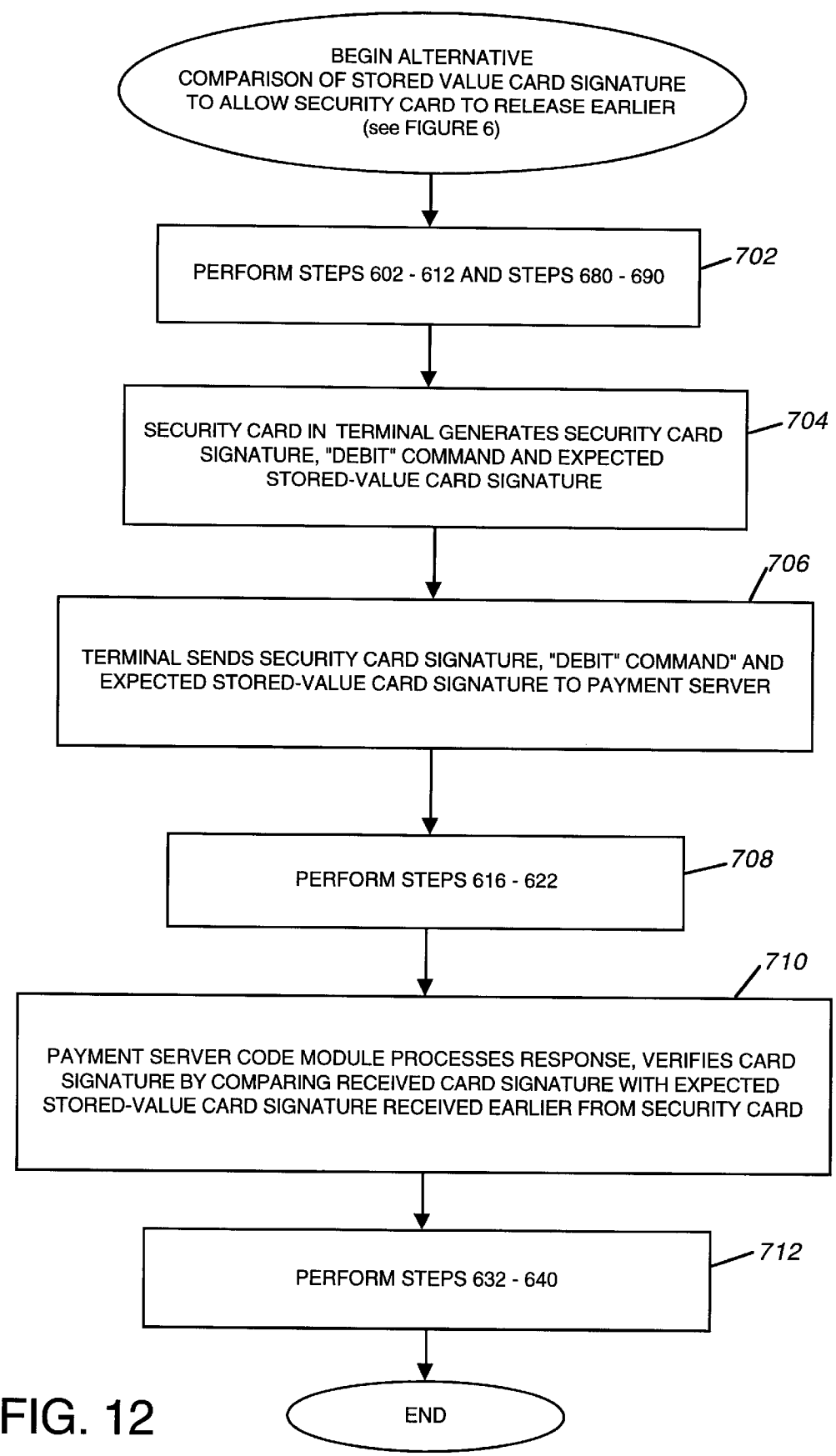
FIG. 12 is a flowchart describing the alternative embodiment of FIG. 6.

FIG. 12 is a flowchart that describes a technique for implementing this embodiment with reference to FIG. 6. Step 702 indicates that communication between the various entities takes place in a similar fashion as in FIG. 5 up until the terminal reaches the "draw amount" state. At this point, draw request 312 has been received and processed by the security card. Next, in step 704 the security card generates not only the security card signature and the debit command, but also an expected stored-value card signature. This expected stored-value card signature is a value expected by the security card from the stored-value card to validate the stored-value card's success message. This validation will ensure that the stored-valued card has in fact debited itself.

In step 706 the security card signature, the debit command and the expected stored-value card signature are sent to the payment code module in the payment server as indicated at 314a. Also, the terminal updates its data store in a similar fashion as in step 630. Next, step 708 indicates that the transaction occurs as before with reference to step 616–622. The steps indicate that the stored-value card receives the debit command, debits itself, and returns the success message (also termed a "debit response" message) and its card signature to the payment server.

Next, in step 710 the payment server code module processes this response from the stored-value card by comparing 346 the received card signature with the expected stored-value card signature received earlier from the security card. This comparison of the two signatures by the payment module of the payment server foregoes the need for another round trip between the payment server and the security card. Because the security card has e already delivered the expected card signature to the payment server, the security card may be released as soon as message 314a is received.

Assuming that the comparison is successful, the payment module is then able to generate its own confirmation message instead of waiting for a "confirmation" message from the security card. Next, step 712 indicates that the processing continues in a similar fashion as in steps 632–640. The confirmation message is passed on to the merchant server by way of the client terminal and the merchant server may then deliver the purchased merchandise to the user.

Second Alternative Embodiment

Figure 7:
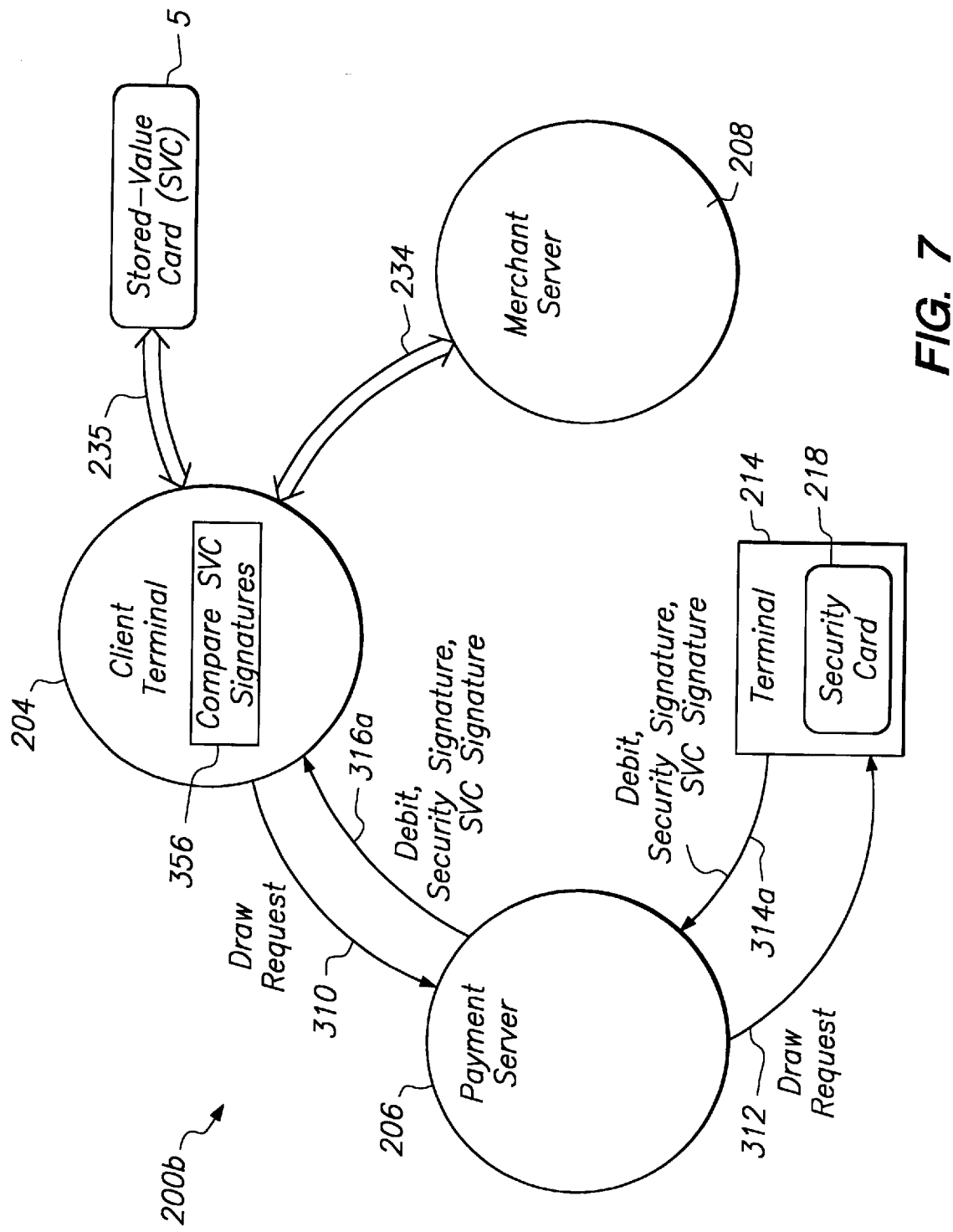
FIG. 7 illustrates yet another embodiment of the present invention having fewer round trip messages between the client terminal and payment server.

In another embodiment 200b of the present invention as illustrated in FIG. 7, not only is the security card allowed to release earlier, but the number of messages exchanged between the client terminal and the payment server are reduced. Instead of comparing stored-value card signatures in the payment server, the expected stored-value card signature from the security card is transmitted to the client terminal where a trusted agent 356 performs the comparison of the expected stored-value card signature with the actual signature received from stored-value card 5. Thus, message exchange between the client terminal and the payment server is reduced to one round trip. This is advantageous in that the time for a transaction is reduced, the security card is released earlier and fewer message exchanges means more reliability over the Internet.

Embodiment 200b includes a client terminal 204, a payment server 206, a merchant server 208, a stored-value card 5, and a terminal 214 having a security card 218. Communication between the various entities may take place in a similar fashion as in FIG. 5 as indicated by communication links 234 and 235.

Figure 13:
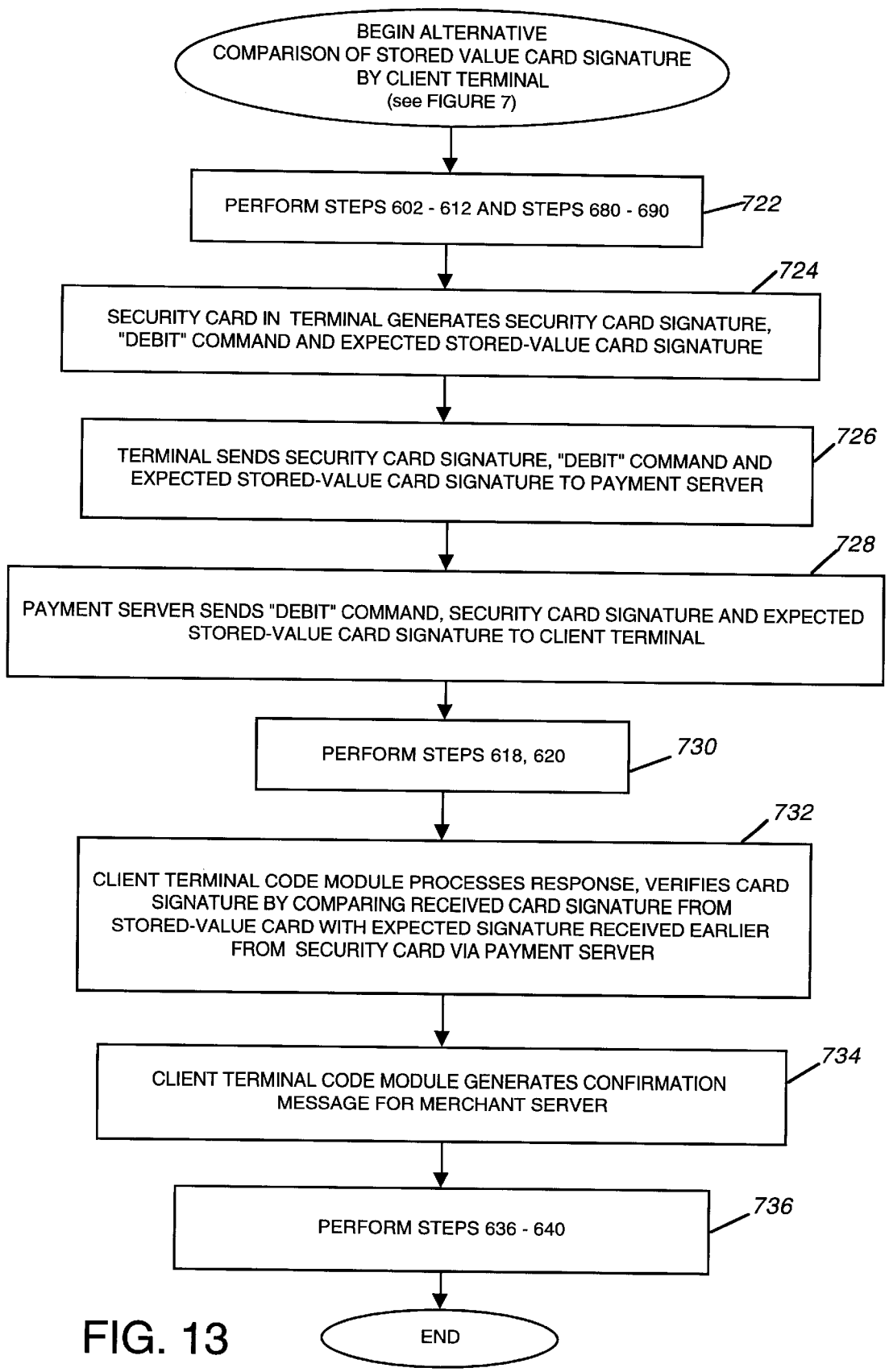
FIG. 13 is a flowchart describing the alternative embodiment of FIG. 7.

FIG. 13 is a flowchart that describes a technique for implementing this embodiment with reference to FIG. 7. Step 722 indicates that communication between the various entities takes place in a similar fashion as in FIG. 5 up until the terminal reaches the "draw amount" state. At this point, draw request 312 has been received and processed by the security card. Next, in step 724 the security card generates not only the security card signature and the debit command, but also an expected stored-value card signature.

In step 726 the security card signature, the debit command and this expected stored-value card signature are sent to the payment code module in the payment server as indicated in 314a. Also, the terminal updates its data store in a similar fashion as in step 630. Next, in step 728 the payment server code module sends the debit command, merchant signature and expected stored-valued card signature to the client terminal.

Next, step 730 indicates that the transaction occurs as before with reference to steps 618 and 620. The steps indicate that the stored-value card receives the debit command and debits itself. In step 732, the client code module itself compares the actual card signature from the stored-value card with the expected signature from the security card. This comparison of the two signatures by the client module of the client terminal foregoes the need for another round trip between the payment server and the client terminal. Also, because the security card has already delivered the expected card signature to the payment server, the security card may be released as soon as message 314a is received.

Assuming that the comparison is successful, the client terminal is then able to generate its own confirmation message in step 734 instead of waiting for a confirmation message from the payment server. Next, step 736 indicates that the processing continues in a similar fashion as in steps 636–640. The confirmation message is passed on to the merchant server and the merchant server may then deliver the purchased merchandise to the user.

Third Alternative Embodiment

Figure 8:
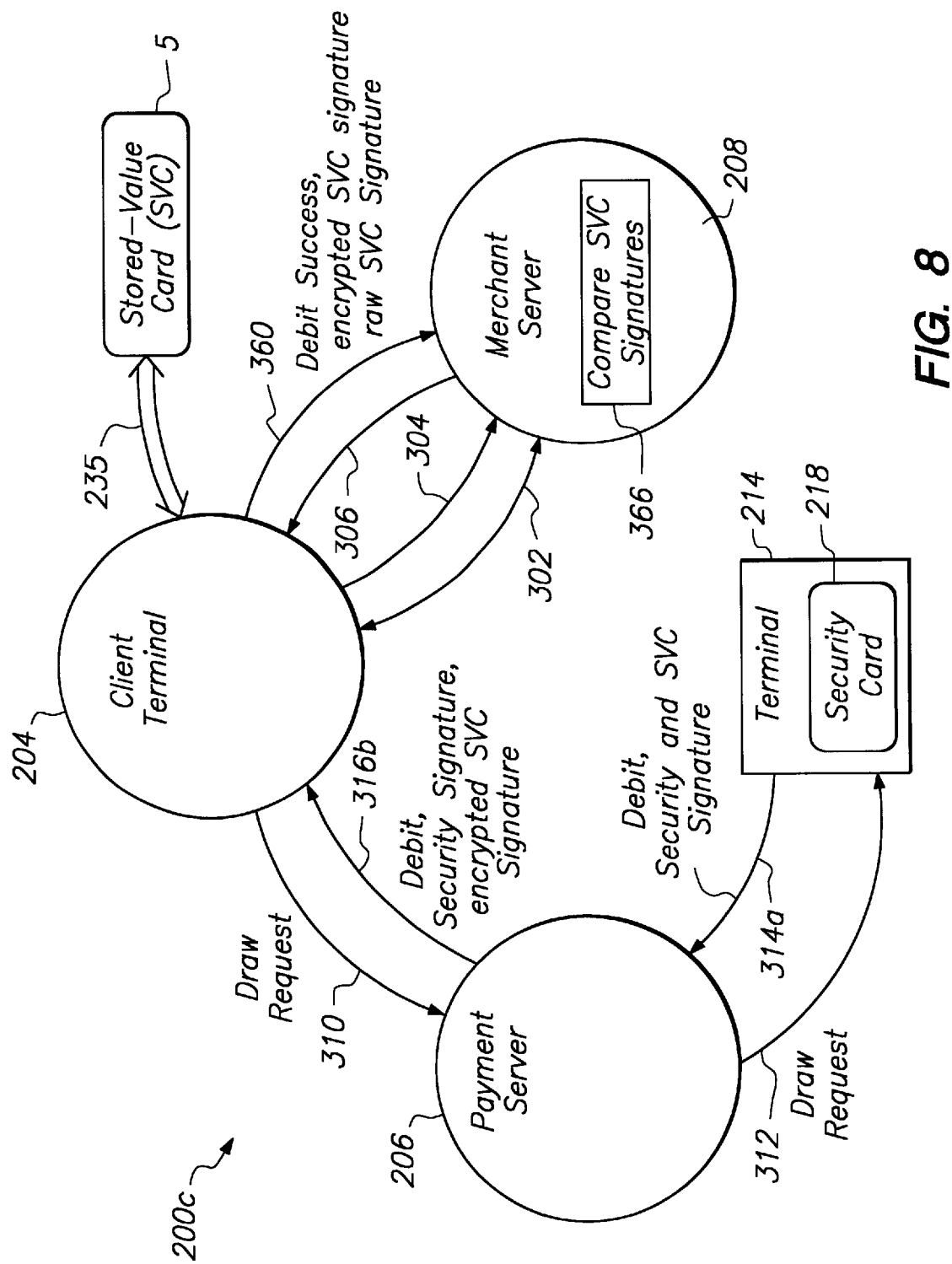
FIG. 8 illustrates still another embodiment of the present invention in which the merchant server compares stored-value card signatures.

FIG. 8 illustrates another embodiment 200c of the invention in which the merchant server performs the comparison of the stored-value card signature with the expected signature. This embodiment has all of the advantages of the previous embodiment in which the security card is released earlier, and there are also fewer messages passed between the entities. In this embodiment, if the client terminal is not to be trusted to compare the stored-value card signatures, then an encrypted signature is passed to the merchant server via the client terminal. The client terminal also passes the raw, unencrypted signature from the stored-value card to the merchant server. A routine 366 in the merchant server then compares the two signatures.

Embodiment 200c includes a client terminal 204, a payment server 206, a merchant server 208, a stored-value card 5, and a terminal 214 having a security card 218. Communication between the various entities may take place in a similar fashion as in FIG. 5 as indicated by messages 302–306 and communication link 235.

Figure 14:
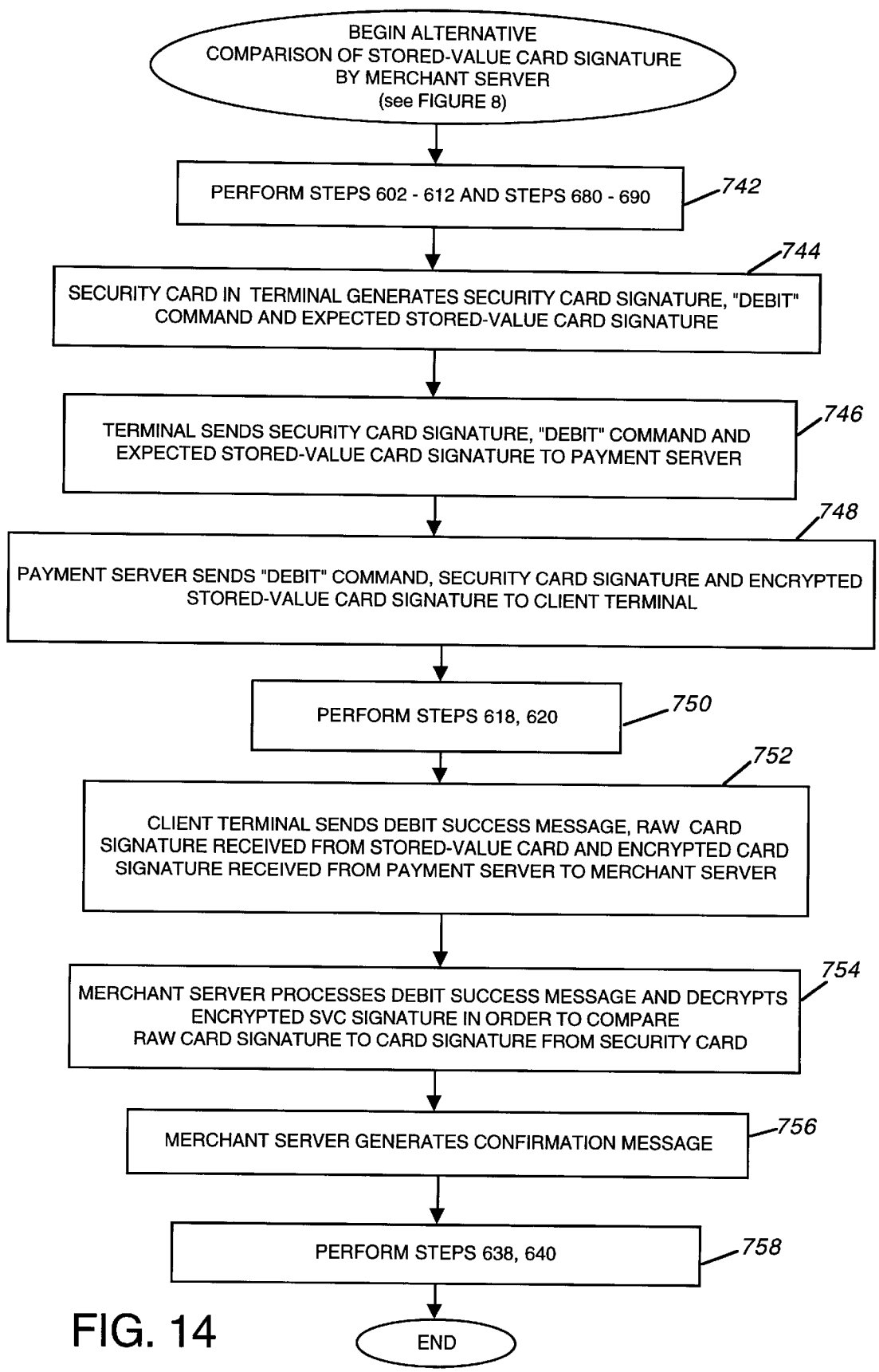
FIG. 14 is a flowchart describing the alternative embodiment of FIG. 8.

FIG. 14 is a flowchart that describes a technique for implementing this embodiment with reference to FIG. 8. Step 742 indicates that communication between the various entities takes place in a similar fashion as in FIG. 5 up until the terminal reaches the "draw amount" state. At this point, draw request 312 has been received and processed by the security card. Next, in step 744 the security card generates not only the security card signature and the debit command, but also an expected stored-value card signature.

In step 746 the security card signature, the debit command and this expected stored-value card signature are sent to the payment code module in the payment server as indicated in 314a. Also, the terminal updates its data store in a similar fashion as in step 630. Next, in step 748 the payment server code module sends the debit command, merchant signature and an encrypted expected stored-valued card signature to the client terminal. The expected stored-valued card signature is encrypted to prevent tampering by the client terminal or other outside entity.

Next, step 750 indicates that the transaction occurs as before with reference to steps 61 8 and 620. The steps indicate that the stored-value card receives the debit command and debits itself. In step 752, the client code module sends the success message, the raw stored-value card signature and the encrypted signature on to the merchant server. In step 754 the merchant server processes the success message, decrypts the encrypted signature, and compares the two signatures. This comparison of the two signatures by the merchant server foregoes the need for another round trip between the payment server and the client terminal. Also, because the security card has already delivered the expected card signature to the payment server, the security card may be released as soon as message 314a is received.

Assuming that the comparison is successful, the merchant server is then able to generate its own confirmation message in step 756 instead of waiting for a confirmation message from the client terminal. Next, step 758 indicates that the processing continues in a similar fashion as in steps 638 and 640. The merchant server may then deliver the purchased merchandise to the user. In all of the above alternative embodiments, when the transaction is not completed successfully, the payment server reverses the transaction within the terminal.

Encryption Layer Embodiment

Figure 9:
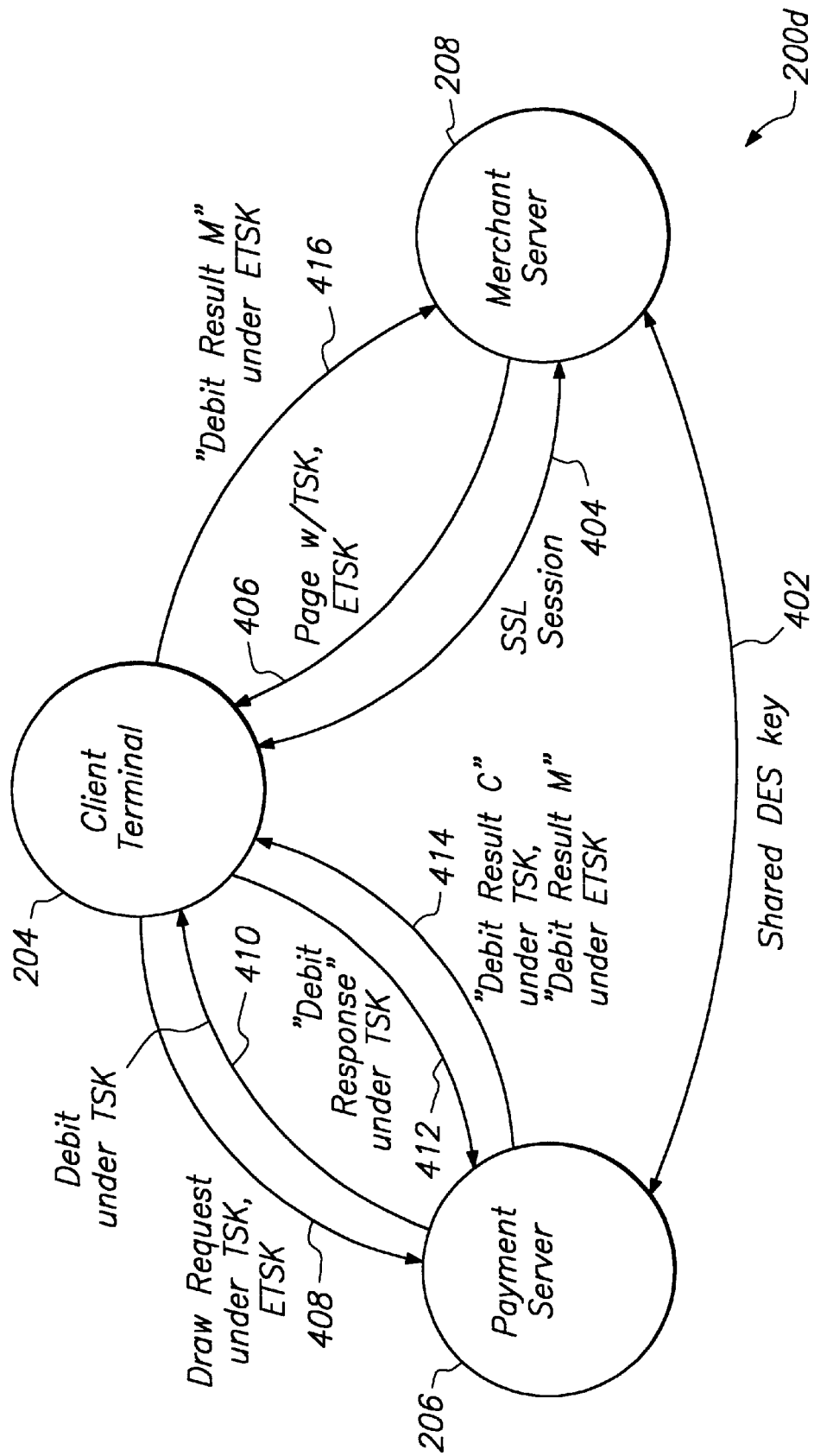
FIG. 9 illustrates an added encryption layer useful for embodiments of the present invention.

FIG. 9 illustrates an embodiment 200d of the present invention in which an encryption layer has been added. Although the present invention may be practiced without this added encryption layer, in a preferred embodiment of the invention, this encryption layer is used. FIG. 9 includes client terminal 204, payment server 206 and merchant server 208. Other elements of the architecture have been omitted in this figure for simplicity. This extra encryption layer is used not only to protect the contents of messages being transmitted over the Internet, but also to prevent a client terminal, stored-value card or other entity from receiving or producing a message that would trick another entity into thinking that a valid transaction had occurred. This encryption also prevents messages from being accidentally or deliberately altered or misdirected.

It should be appreciated that encryption may be present in any embodiment on all parts of any message sent for security. Preferably, any signature sent over a network is always encrypted.

FIGS. 15A and 15B are a flowchart describing this embodiment of the invention with reference to FIG. 9. In step 802, the payment server and the merchant server share a unique encryption key. Through a prior business arrangement, both of the servers have arranged to share this unique key to add security to the transaction. The shared key may be of any suitable encryption standard and of any length. Preferably, the key is a Data Encryption Standard (DES) key having a length of 128 bits including parity. Although this shared key could be used directly, in a preferred embodiment of the invention, there is a derived unique key for each transaction between the merchant server and the payment server. Alternatively, another encryption standard such as RSA may also be used.

In step 804 the client terminal and the merchant server engage in a protected Secure Sockets Layer (SSL) session 404 in which a connection is made, a user browses and makes a purchase selection. The SSL session protects the information transmitted over the Internet such as card information, commands, and encryption keys from being discovered by an unauthorized party. Other techniques for protecting a session may also be used.

In step 806 the merchant server derives a key from the DES key using information unique to the transaction such as the merchant identifier, the transaction identifier, or other information unique to this transaction, such as a random number. Because the payment server shares the DES key with the merchant server and also has access to this unique information about the transaction, the payment server will also be able to derive this same key from the shared DES key. In this step the merchant server also creates a transaction session key (TSK) for use by the client terminal and payment server in encrypting information.

In step 808 the merchant server downloads an HTML page of information 406 that includes the TSK and the TSK that is encrypted using the derived key (ETSK). The TSK encrypted with the derived key will be used by the payment server to return an encrypted (and unreadable by the client) confirmation message to the merchant server. Only the merchant server will be able to decrypt this confirmation message and will thus be guaranteed that a successful transaction has occurred and that merchandise may be released to the client.

In step 810, the client prepares the draw request in conjunction with the stored-value card and sends the draw request 408 encrypted with the TSK to the payment server along with the ETSK. In step 812 the payment server uses the shared DES key and the prearranged information unique to the transaction to derive the same key that the merchant server has used. Thus, the derived key can be used to decrypt the ETSK in order to produce the TSK. Once the payment server had produced the TSK, it may decrypt the draw request and process the draw request in any suitable fashion with the security card. Once the payment server has received the debit command from the security card, it encrypts the debit command with the TSK. The debit command may also be termed the "debit IEP command."

In step 814 the payment server sends the encrypted debit command 410 to the client terminal. In step 816 the client decrypts the debit command with the TSK it had received earlier from the merchant server and processes the debit command in a suitable fashion with a stored-value card. Once the client terminal has received the debit response message from the stored-value card, it encrypts this message with the TSK and sends the debit response message 412 to the payment server. In step 820, the payment server decrypts the debit response message with the TSK and processes the debit response message in a suitable fashion with the security card.

Once the payment server has received a "debit result" message from the security card, the payment server encrypts the "debit result" message with the TSK to form a "debit result C" message for the client. The "debit result C" message will be used by the client terminal to inform the user of a successful transaction. The payment server also generates its own confirmation message and encrypts the confirmation message with the derived key to form a "debit result M" message. The payment server then sends 414 the "debit result C" message and the "debit result M" message to the client terminal.

In step 822 the client terminal decrypts and processes the "debit result C" message and passes the "debit result M" message 416 on to the merchant server. Because the "debit result M" message is encrypted with the derived key, the client terminal or other entity is not able to tamper with it. In step 824 the merchant server is able to decrypt the "debit result M" message because it had originally produced the derived key from the DES key. Once the merchant server has determined that a valid "debit result M" message has been received, it confirms that a valid transaction has taken place and may release merchandise to the user.

This security embodiment of FIG. 9 may be used with any of the previously described embodiments of the invention. By way of example, this security embodiment may be used with the embodiments of FIGS. 7 and 8 in which there is only one round trip between the client terminal and the payment server. In particular, the expected stored-value card signature received from the security card may be encrypted with the derived key so that it unreadable by the client, yet the merchant server will be able to compare the received stored-value card signature with the expected card signature to validate the transaction.

A wide variety of terminology may be used to describe the keys described above. For example, the keys referred to above as shared DES key, transaction session key (TSK) and derived key, may also be referred to as shared key, session C key and session M key.

Authentication Embodiment

Figure 16:
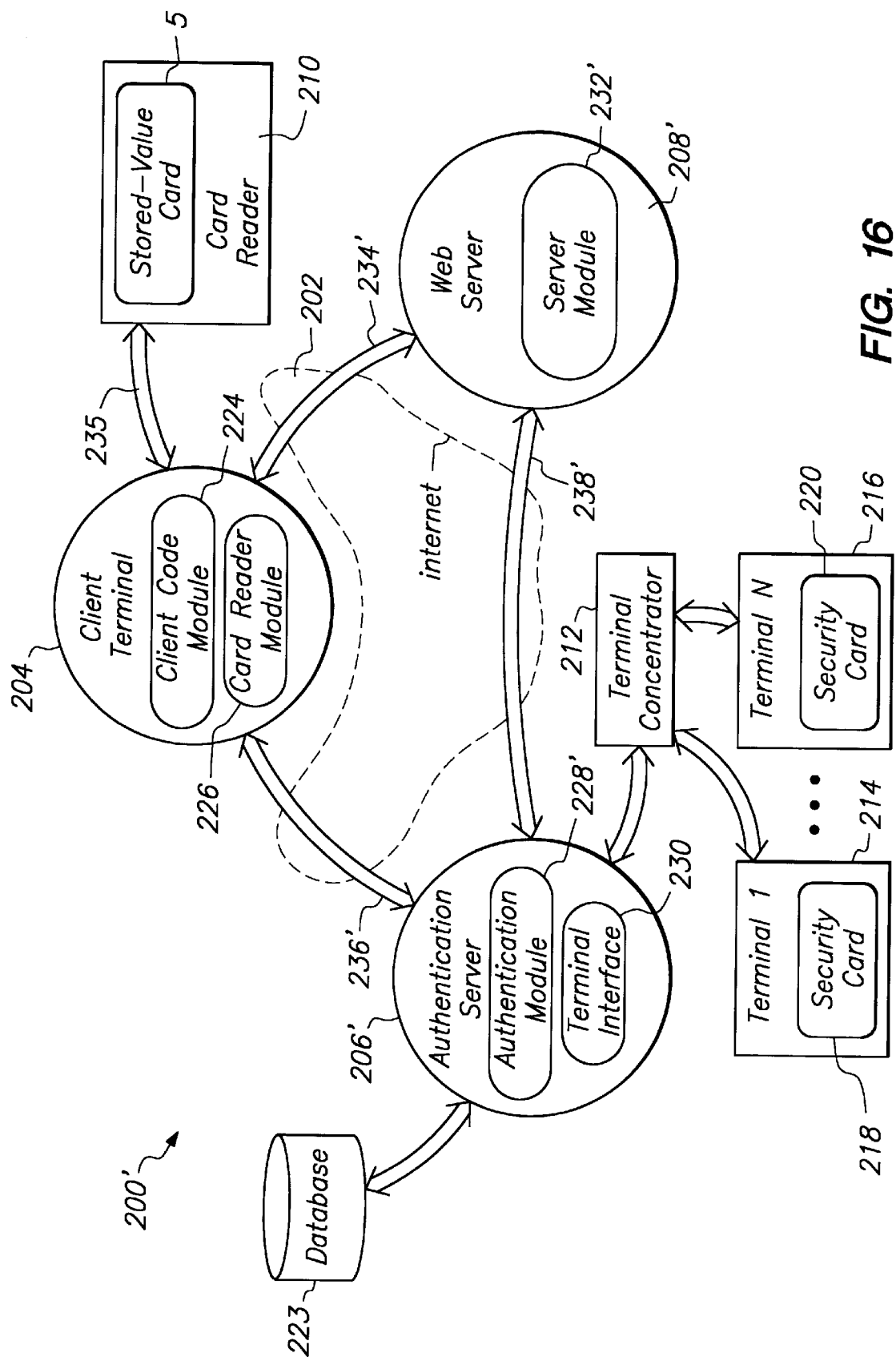
FIG. 16 illustrates an architecture and system for authentication over an internet using a stored-value card.

FIG. 16 illustrates an architecture and system 200' for authentication over an internet (such as the Internet) using a pseudo stored-value application. This application could reside on a stored-value card along with standard accounts, stored value, or other card applications. The card defines access to the pseudo stored-value service and ensures that the card is present and passes security checks.

In one embodiment of the present invention, a consumer may wish to access any of a variety of Web servers in order to redeem frequent flyer miles, award points, etc., that he or she has accumulated. In this embodiment, a consumer has accumulated "points" through any of a variety of programs with airlines, restaurants, rental car companies, hotels, banks, credit or debit card issuers, telephone or other communication company, etc. The consumer wishes to redeem these points to receive free airline tickets, meals, car rental, overnight stays, prizes, awards, discounts, or other "benefits". By accessing a Web server associated with the particular program, the consumer is able to use his or her card in any of the embodiments described herein to authenticate the card and to receive these benefits from the program. Most often, a card has a card number that is associated with the consumer's name in a database on the Web server. This card number is transmitted to the Web server as part of the card signature, or in a similar fashion. Thus, an authenticated card used in this embodiment to redeem services may be matched to the appropriate consumer.

For example, a consumer with 30,000 frequent flyer miles on one airline may use this embodiment of the present invention to access a Web server associated with the airline. The consumer is requesting a free round-trip ticket in exchange for 20,000 miles. The present invention then operates to authenticate the consumer's stored-value loyalty application on the card, and delivers a confirmation of authentication message to the Web server for the airline. The Web server then deducts 20,000 miles from the consumer's account (leaving 10,000 miles) and delivers the free ticket to the consumer. In one specific embodiment, the Web server associated with the airline (or the airline itself) keeps track of the consumer's account and deducts the mileage. In this instance, an authentication application is used to validate the presence of the card or to obtain access to the Web server site.

In another specific embodiment, the consumer's card contains a loyalty application that stores the consumer's accumulated frequent flyer mileage; the mileage from the card is then debited and confirmed to the Web server in a similar fashion as described in various of the embodiments by which a cash value is stored on and debited from a card.

System 200' may be implemented in a similar fashion as system 200 of FIG. 4. The elements shown in system 200' having counterparts in system 200 are described above and have similar functionality. System 200' includes a web server 208' that may be any suitable computer server capable of presenting award information (hereinafter "benefits") to a consumer over an open network such as the Internet. Web server 208' may be the same as merchant server 208 of FIG. 4 or a separate computer. Preferably, web server 208' is implemented in a similar fashion as described above for merchant server 208. Web server 208' includes server module 232' that is preferably implemented in a similar fashion as merchant module 232. Additionally, server module 232' includes functionality to store and present benefits that are available for particular consumers. For example, benefits available such as airline tickets, prizes, etc., may be presented.

Points (such as frequent flyer miles, for example) that a consumer accumulates to achieve benefits may be linked to a particular consumer by an account number, password, or other identifier. The amount of points accumulated for each consumer may be stored on web server 208' using server module 232', or may be located in another database of the organization providing the benefits. In an alternative embodiment, these points for each program that a consumer is enrolled in are stored in a loyalty application on the consumer's card. For example, a consumer may have a stored-value card that in addition to storing monetary value, also stores a quantity of frequent flyer miles accumulated for a particular airline (or a number of airlines), points accumulated for using a particular credit card, points for hotel stays at particular hotels, etc. For points stored on the consumer's loyalty application card, these points may be verified and debited in much the same way that monetary value on the consumer's card is debited as described herein.

One embodiment by which a consumer has his or her pseudo stored-value application on a card authenticated to redeem points for benefits will now be explained. In one specific embodiment, a technique similar to that described in the flowcharts of FIGS. 11A–11D for debiting monetary value may be used. Initially, a user (consumer) operating client terminal 204 accesses web server 208' over link 234', views benefits presented for a particular program (such as an airline's frequent flyer program), selects benefits from that program, and requests the transaction to be performed using his or her pseudo stored-value application to validate that the card has access to the services. Web server 208' receives and processes this request. The above steps may be performed in a similar fashion as steps 602 and 604.

Next, similar to step 606, web server 208' sends a page of information to client terminal 204. When claiming benefits, the total cost field is zero and the currency field is a specially assigned value. Keeping total cost field equal to zero causes the system to perform authentication but not to create a payment record. Alternatively, for those user's whose card holds the amount of their points, additional fields may be sent from server 208' to terminal 204 indicating which account to debit and by how many points. The total cost and currency fields may be readily adapted for this purpose.

Next, in a similar fashion to steps 608–612, a draw request message is built, and the draw request is sent to authentication server 206' over link 236'. Similar to step 614, the authentication server now processes the draw request in conjunction with security card 218 (for example) and sends back a "debit" command and a security card signature to authentication server 206'. As total cost is zero, the "draw amount" state reached by security card 218 is also zero. In the alternative embodiment in which stored-value card 5 stores points for a particular program, total cost may be a value and a "draw amount" state may be reached indicating a number of points to be deducted from card 5.

Next, similar to steps 616–618, authentication server 206' sends the debit command and security card signature to client terminal 204 and this information is processed by card 5. Even though a monetary value is not being debited, card 5 performs processing such as incrementing a counter indicating number of transactions and generating a stored-value card signature. In the alternative embodiment in which points are stored on card 5, the points needed to redeem the benefit chosen by the user from web server 208' may be debited from the appropriate account in this step.

Figure 11A:
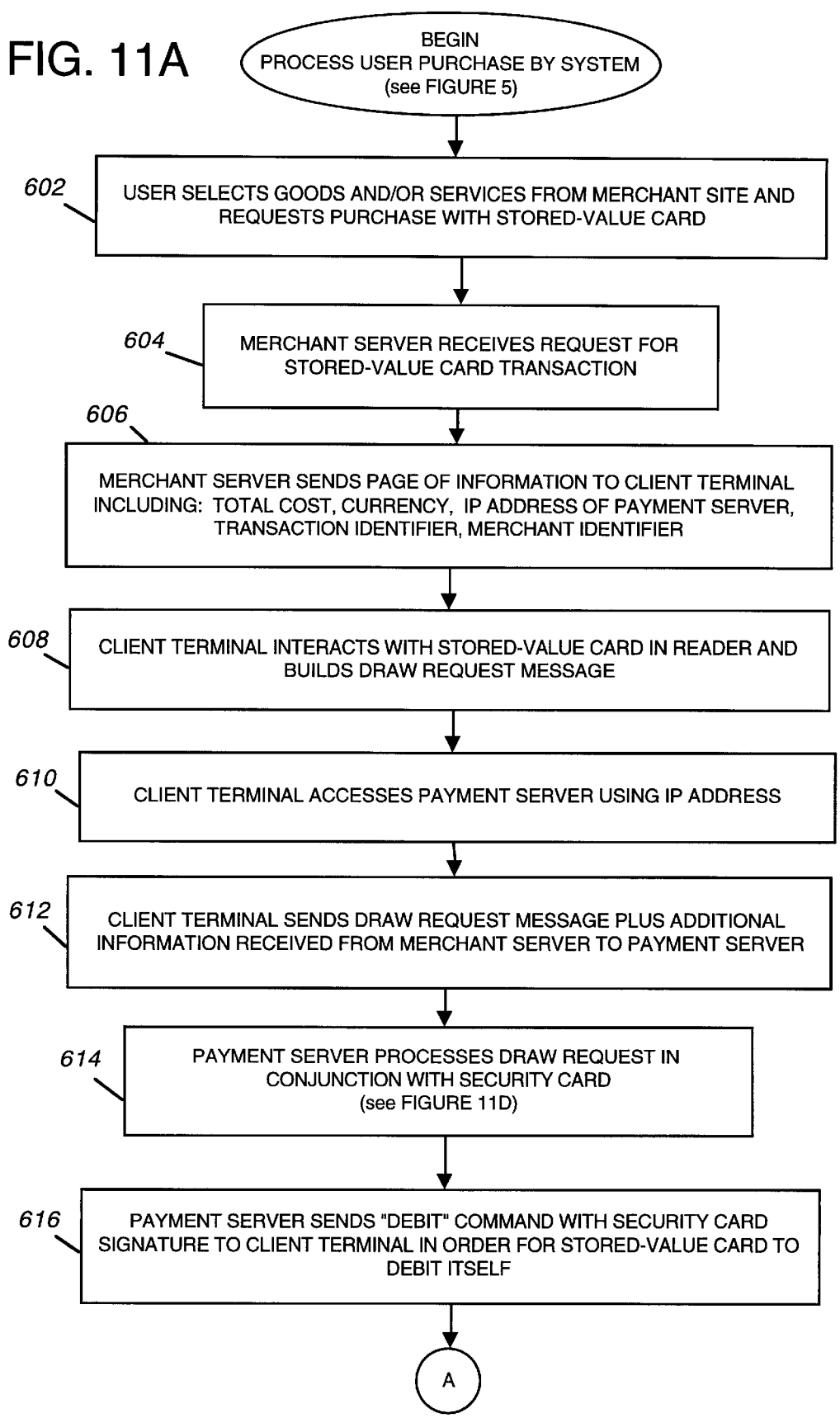
Figure 11C:
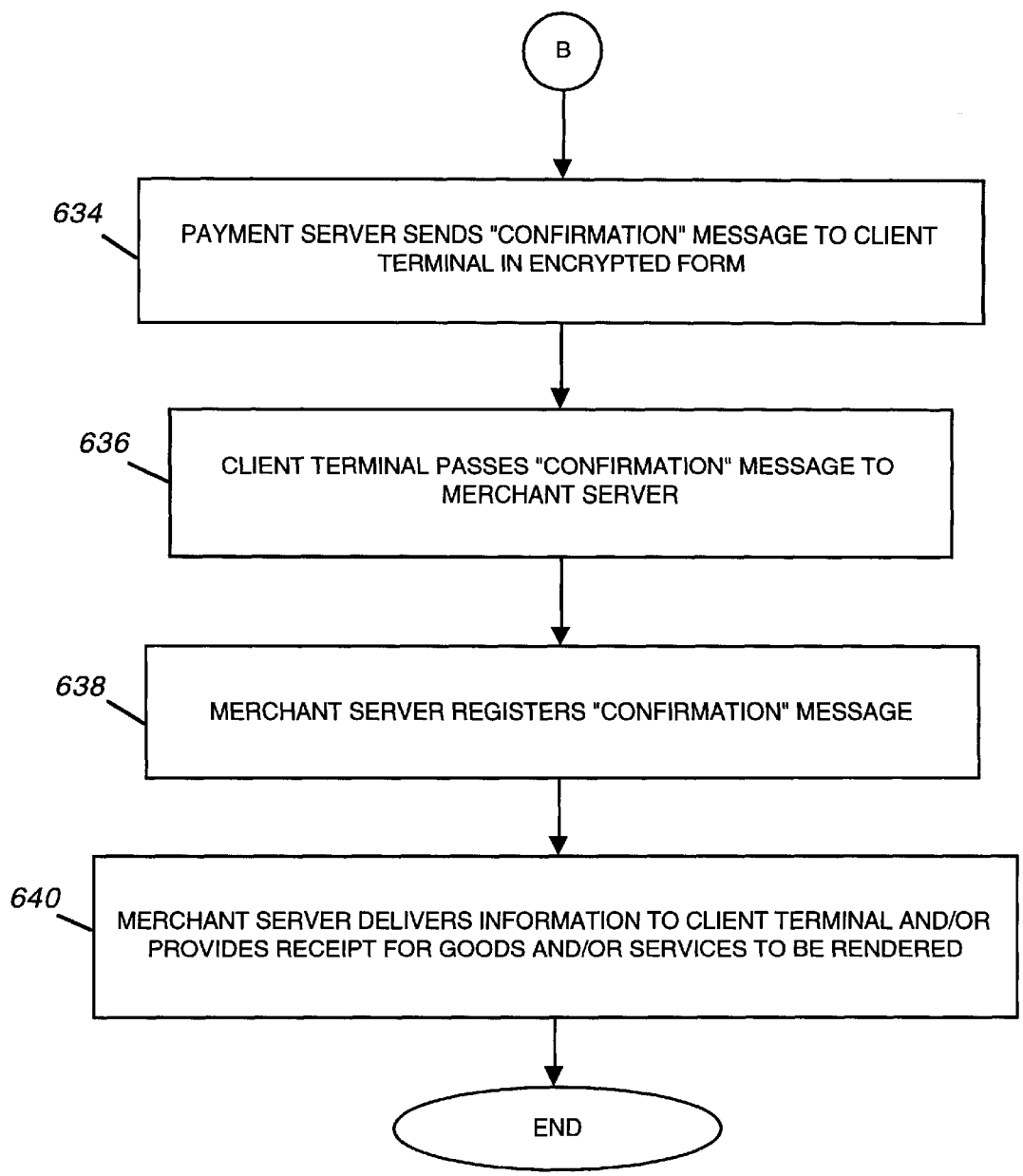

Steps 620 through 638 are performed in a similar manner as in FIGS. 11B and 11C, except that in this case a monetary transaction is not being verified, but rather card 5 is being authenticated to allow the user to complete his access to services or benefits. In step 626 in particular, the signature of card 5 is verified by security card 218. In this embodiment, security card 218 would send an "authentication OK" message rather than the "confirmation" message of step 628. Web server 208' then debits the appropriate number of points from the user's account or allows access to a privileged service for the benefit requested. In the alternative embodiment in which points are stored on card 5, the "authentication OK" message serves not only as an authentication of card 5, but also confirmation that the correct number of points have been debited from card 5 for the appropriate program. Next, similar to step 640, web server 208' releases the benefit requested by the user (such as airline tickets, prizes, discounts, etc.) and the benefit is arranged to be delivered to the user.

It should be appreciated that this technique of redeeming points for benefits may also be practiced using any of the alternative embodiments of FIGS. 6, 7 or 8, thereby obtaining the advantages associated with those embodiments. Furthermore, this technique may take advantage,of the encryption layer embodiment of FIG. 9.

Computer System Embodiment

Figure 17:
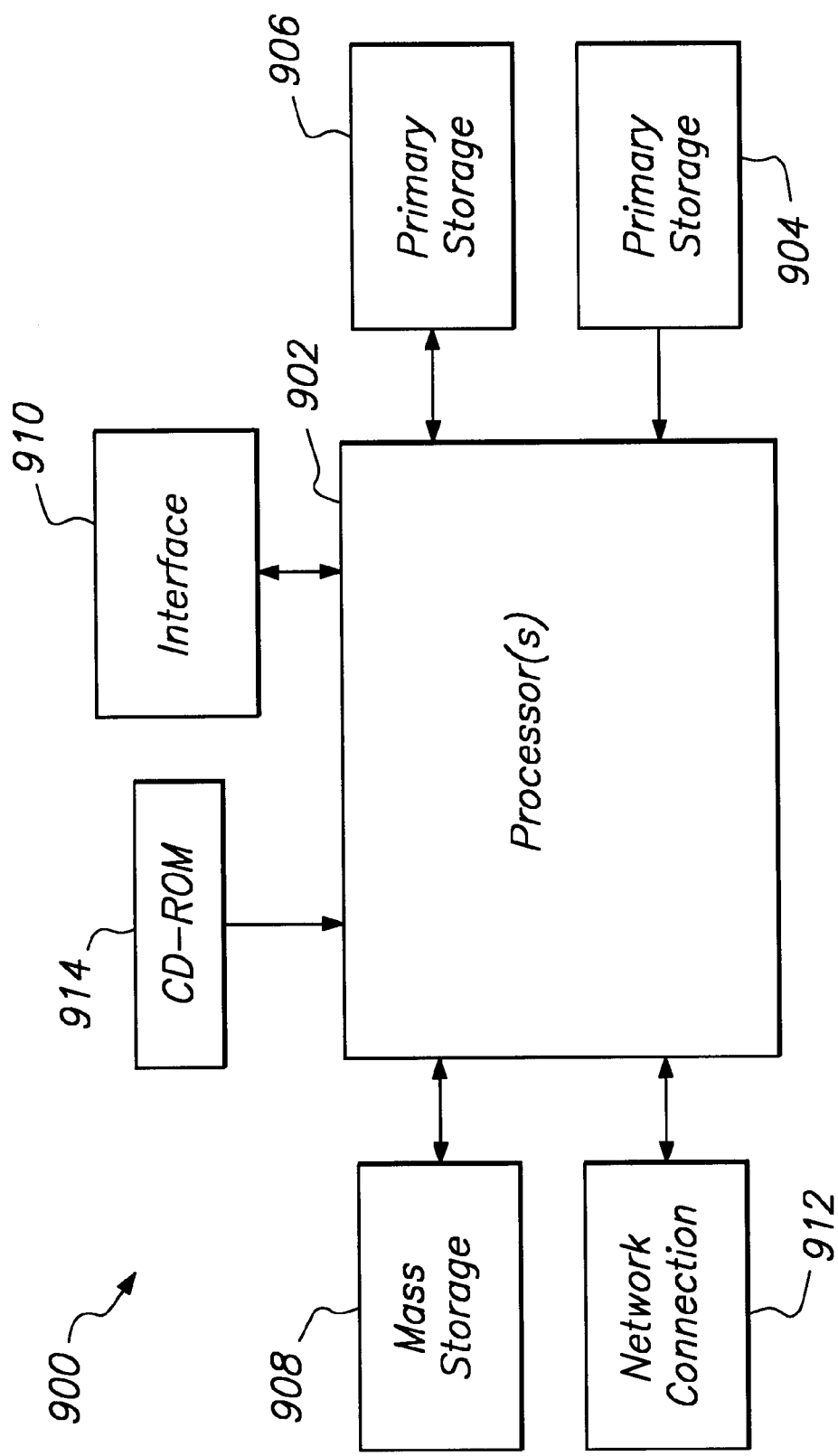
FIG. 17 is a block diagram of a typical computer system suitable for use in embodiments of the present invention.

FIG. 17 illustrates a computer system 900 that may be used with embodiments of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions uni-directionally to the CPU and primary storage 906 is used typically to transfer data and instructions in a bidirectional manner. Both of these primary storage devices may include any suitable combination of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, any suitable stored-value card capable of storing and decrementing value on command may be used with the present invention. Also, any network capable of performing routing functionality between a client terminal and a payment and merchant server may be used. Furthermore, the security card may be a physically separate card located in a terminal attached to a payment server, or its functionality may be incorporated directly into a payment server in hardware or software. And although the client terminal may be used to route messages between the merchant server and payment server, both of these servers may also communicate directly between themselves, and may even be the same computer. The specific messages shown passing between the computers are exemplary, and other types of messages may be used. A specified draw request is shown, but other information may also be retrieved from a stored-value card using a security card emulation and then sent packaged as one message to the security card over a network. Any suitable type of encryption may be used to encrypt messages passing between the computers. Therefore, the described embodiments should be taken as illustrative and not restrictive, and the invention should not be limited to the details given herein but should be defined by the following claims and their full scope of equivalents.

We claim:

1. A network payment system for transacting a sale of merchandise over a network using a stored-value card, said network payment system comprising:

a router for routing communication between entities attached to said network;

a merchant server in communication with said network, said merchant server having at least a first item of merchandise for sale;

a client terminal in communication with said network, said client terminal including a card reader for communicating with said stored-value card, an output device for reviewing said first item for sale, and an input device for initiating a purchase transaction to purchase said first item for sale, said client terminal being arranged to build a purchase message using information obtained from said stored-value card, said stored-value card being arranged to debit itself upon receiving a debit command from a security card; and a payment server in communication with said network, said payment server including an interface for communicating with said security card and being arranged to receive said purchase message including an indication of said purchase transaction and to transmit a confirmation message to said merchant server over said network, said security card being arranged to create said debit command intended for said stored-value card, whereby said merchant server is authorized to release said item of merchandise to a user associated with said stored-value card.

2. A network payment system as recited in claim 1 wherein said network is an internet and said merchant server includes a merchant web site for advertising said first item for sale over said internet.

3. A network payment system as recited in claim 2 wherein said client terminal and said merchant server are at separate locations and communicate over said internet.

4. A network payment system as recited in claim 1 further comprising:

a clearing and administration system for reconciling a plurality of transactions over said network.

5. A network payment system as recited in claim 1 wherein said client terminal further includes a command emulator for emulating security card commands that are sent to said stored-value card and for grouping responses to said security card commands into a draw request message to be sent to said payment server, and said payment server includes a response emulator for emulating responses from said stored-value card that are sent to said security card.

6. A network payment system as recited in claim 1 wherein said payment server includes a comparator for comparing a stored-valued card signature received from said stored-value card with an expected signature received from said security card to confirm a transaction, whereby the message traffic between said payment server and said security card is reduced.

7. A network payment system as recited in claim 1 wherein said client terminal includes a comparator for comparing a stored-valued card signature received from said stored-value card with an expected signature from said security card received via said payment server to confirm a transaction, whereby message traffic between said payment server and said client terminal, and between said payment server and said security card is reduced.

8. A network payment system as recited in claim 1 wherein said merchant server includes a comparator for comparing a stored-valued card signature received from said stored-value card with an expected signature from said security card received via said payment server, whereby a transaction is confirmed and whereby message traffic from said payment server, and between said payment server and said security card is reduced.

9. A network payment system as recited in claim 1 further comprising:
a draw request encryption apparatus for providing an encrypted draw request message to said payment server from said client terminal;
a key encryption apparatus for providing a key to decrypt said encrypted draw request message to said payment server without sending said key in the clear to said payment server; and
a confirmation encryption apparatus for providing an encrypted transaction confirmation message to said merchant server from said payment server that is encrypted by a key shared between said merchant server and said payment server.

10. A computer-implemented method of selling merchandise over a network using a merchant server, said merchandise for purchase by a user with a stored-value card, said method comprising:
establishing communication between said merchant server and a client over said network;
receiving a request from said client to purchase an item available from said merchant server;
transmitting to said client a purchase amount of said item so that said client may build a draw request message using information obtained from a stored-value card and debit said stored-value card associated with said client by said amount upon receiving a debit command from a security card;
transmitting said amount, a transaction identifier and a merchant identifier to a payment server connected to said network, said payment server being associated with said security card that creates a debit command intended for said stored-value card and secures the purchase of said item, said transaction identifier uniquely identifying the purchase of said item and said merchant identifier uniquely identifying said merchant server to said payment server; and
confirming said purchase of said item to said merchant server, whereby said merchant server is informed that said purchase of said item is a success and said merchant server may release said item to said user associated with said stored-value card.

11. A method as recited in claim 10 wherein said network is an internet over which said recited steps of said method occur, wherein said merchant server includes a merchant web site for advertising said merchandise over said internet, and wherein said client and said merchant server are at separate locations.

12. A method as recited in claim 10 wherein said confirming step includes receiving a confirmation message that originates from one of said payment server and said security card associated with said payment server.

13. A method as recited in claim 10 wherein said confirming step includes receiving a confirmation message that originates from said client, whereby message traffic between said payment server and said client terminal, and between said payment server and a said security card is reduced.

14. A method as recited in claim 10 wherein said confirming step includes:
receiving a raw signature from said stored-value card associated with said client;
receiving an expected signature of said stored-value card that originates with a said security card associated with said payment server; and
comparing said raw signature to said expected signature, whereby message traffic between said payment server and said client terminal, and between said payment server and said security card is reduced.

15. A method as recited in claim 10 further comprising:
transmitting a first key to said client for encrypting a draw request message to be sent to said payment server from said client terminal;
providing said first key to decrypt said encrypted draw request message to said payment server without sending said first key in the clear to said payment server; and
receiving an encrypted transaction confirmation message from said payment server that is encrypted by a second key shared between said merchant server and said payment server.

16. A method as recited in claim 10 wherein said step of transmitting said purchase amount and said confirming step are routed through said client to provide communication between said merchant server and said payment server.

17. A computer-implemented method of transacting a sale of merchandise over a network using a client terminal in association with a stored-value card, said method comprising:
transmitting over said network a request from said client terminal to purchase an item available from said merchant server;
receiving from said merchant server an amount of a cost of said item;
building a draw request message using information obtained from said stored-value card;
sending said draw request message to a payment server connected to said network so that said draw request may be processed by a security card associated with said payment server;
receiving a debit command from said payment server, said debit command having been created by said security card;

debiting said stored-value card associated with said client terminal by said amount in response to said debit command; and sending confirmation information to said merchant server, whereby said merchant server is informed that said sale of said item is a success and said merchant server may release said item to a user associated with said stored-value card.

18. A method as recited in claim 17 wherein said network is an internet over which said recited steps of said method occur, wherein said merchant server includes a merchant web site for advertising said merchandise over said internet, and wherein said client terminal and said merchant server are at separate locations.

19. A method as recited in claim 17 further comprising:
emulating security card commands that are sent to said stored-value card associated with said client terminal; and grouping responses to said security card commands into said draw request message so that said responses may be sent as a group to said payment server to reduce network traffic between said payment server and said client terminal.

20. A method as recited in claim 17 wherein said confirmation information includes an encrypted confirmation message unreadable by said client terminal, said method further comprising:
receiving said encrypted confirmation message from said payment server.

21. A method as recited in claim 17 wherein said confirmation information includes a confirmation message, said method further comprising:
receiving an expected stored-value card signature from said security card via said payment server;
receiving an actual stored-value card signature from said stored-value card;
comparing said actual stored-valued card signature received from said stored-value card with said expected stored-value card signature from said security card; and
generating said confirmation message for transmission to said merchant server, whereby message traffic between said payment server and said client terminal, and between said payment server and said security card is reduced.

22. A method as recited in claim 17 further comprising:
receiving an encrypted stored-value card signature from said security card via said payment server that is unreadable by said client terminal;
receiving a raw stored-value card signature from said stored-value card; and
transmitting to said merchant server as said confirmation information said encrypted stored-value card signature and said raw stored-value card signature for comparison by said merchant server, whereby message traffic between said payment server and said client terminal, and between said payment server and said security card is reduced.

23. A method as recited in claim 17 further comprising:
receiving a key from said merchant server for encrypting said draw request message to be sent to said payment server;
receiving an encrypted version of said key that is unreadable by said client terminal, said key being encrypted using a shared key that is known to said payment server and to said merchant server; and sending said encrypted version of said key to said payment server without sending said key in the clear to said payment server, whereby said payment server may decrypt and obtain said key to decrypt said draw request message.

24. A method as recited in claim 17 further comprising:
receiving a security card signature for validating said security card to said stored-value card, said security card signature being received in the same message from said payment server as said debit command; and
receiving an expected stored-value card signature for comparison to an actual stored-value card signature, said expected stored-value card signature being received in the same message from said payment server as said debit command, whereby message traffic between said payment server and said client terminal, and between said payment server and said security card is reduced.

25. A computer-implemented method of managing a transaction between a client terminal and a merchant server connected over a network, said transaction being managed by a payment server also connected to said network, said method comprising:
receiving a draw request over said network, said draw request including an amount indicative of a cost of an item available from said merchant server, a transaction identifier uniquely identifying the purchase of said item, and a merchant identifier uniquely identifying said merchant server to said payment server, said draw request having been built using information obtained from a stored-value card associated with said client terminal;
sending said draw request to a security card associated with said payment server so that said draw request may be processed by said security card;
receiving a debit command from said security card;
sending said debit command from said payment server destined to said client terminal over said network so that said stored-value card associated with said client terminal may be debited by said amount; and
a confirmation step for performing the function of confirming said purchase of said item to said merchant server, whereby said merchant server is informed that said purchase of said item is a success and said merchant server may release said item to a user associated with said stored-value card.

26. A method as recited in claim 25 wherein said network is an internet over which said recited steps of said method occur, wherein said merchant server includes a merchant web site for advertising said item over said internet, and wherein said client terminal and said merchant server are at separate locations.

27. A method as recited in claim 25 further comprising:
sending transaction information regarding said sale of said item to a clearing and administration system for reconciling said sale.

28. A method as recited in claim 25 further comprising:
receiving as part of said draw request responses from said stored-value card to security card commands that have been emulated by said client terminal; and
emulating said stored-value card responses in an interaction with said security card to receive responses from said security card, whereby network traffic between said payment server and said client terminal is reduced.

29. A method as recited in claim 25 wherein said confirmation step includes the sub-steps of:

receiving a signature from said stored-value card associated with said client terminal;

sending said signature to said security card;

receiving a transaction OK message from said security card; and sending a confirmation message destined for said merchant server.

30. A method as recited in claim 25 wherein said confirmation step includes the sub-steps of:

receiving a signature from said stored-value card associated with said client terminal;

comparing said received signature with an expected signature received from said security card; and sending a confirmation message destined for said merchant server, whereby message traffic between said security card and said payment server is reduced.

31. A method as recited in claim 25 wherein said confirmation step includes the sub-steps of:

receiving an expected signature of said stored-value card from said security card; and sending said expected signature to said client terminal so that said client terminal may compare said expected signature to an actual signature of said stored-value card, whereby message traffic between said security card and said payment server, and between said client terminal and said payment server is reduced.

32. A method as recited in claim 25 wherein said confirmation step includes the sub-steps of:

receiving an expected signature of said stored-value card from said security card;

encrypting said expected signature so as to be unreadable by said client terminal; and sending said encrypted expected signature to said client terminal for resending to said merchant server so that said merchant server may compare said expected signature to an actual signature of said stored-value card, whereby message traffic between said security card and said payment server, and between said client terminal and said payment server is reduced.

33. A method as recited in claim 25 further comprising:

receiving said draw request message that is encrypted with a session key;

receiving an encrypted version of said session key, said session key being encrypted using a shared key that is known to said payment server and to said merchant server; and decrypting said session key using said shared key, whereby said payment server may decrypt said draw request message using said session key.

34. A method as recited in claim 25 further comprising:

sending a security card signature for validating said security card, said security card signature being sent in the same message destined to said client terminal as said debit command; and sending an expected stored-value card signature for comparison to an actual stored-value card signature, said expected stored-value card signature being sent in the same message destined to said client terminal as said debit command, whereby message traffic between said payment server and said client terminal, and between said payment server and said security card is reduced.

35. A method as recited in claim 25 wherein said steps of receiving a draw request, sending said debit command and said confirmation step are routed through said client terminal to reduce network traffic.

36. A computer-implemented method of interacting with a stored-value card by a client terminal to facilitate the sale of an item of merchandise over a network, said method comprising:

receiving a purchase amount for said item of merchandise from a merchant server connected to said network;

emulating a plurality of security card commands that are sent to said stored-value card associated with said client terminal;

receiving a plurality of responses to said security card commands from said stored-value card;

grouping said responses to said security card commands from said stored-value card together with said purchase amount to form a draw request message; and sending said draw request message to a payment server over said network so that said draw request may be processed by a security card associated with said payment server to facilitate said sale of merchandise over said network, whereby network traffic between said payment server and said client terminal is reduced.

37. A method as recited in claim 36 wherein said network is an internet over which said recited steps of said method occur, wherein said merchant server includes a merchant web site for advertising said merchandise over said internet, and wherein said client terminal and said merchant server are at separate locations.

38. A method as recited in claim 36 further comprising:

receiving an encrypted confirmation message from said payment server that is unreadable by said client terminal; and sending said encrypted confirmation message to said merchant server, whereby said merchant server is informed that said sale of merchandise is a success and said merchant server may release said merchandise to a user associated with said stored-value card.

39. A method as recited in claim 36 further comprising:

receiving an expected stored-value card signature from said security card via said payment server;

receiving an actual stored-value card signature from said stored-value card;

comparing said actual stored-valued card signature received from said stored-value card with said expected stored-value card signature from said security card; and generating a confirmation message for transmission to said merchant server, whereby message traffic between said payment server and said client terminal, and between said payment server and said security card is reduced, and whereby said merchant server is informed that said sale of merchandise is a success and said merchant server may release said merchandise to a user associated with said stored-value card.

40. A method as recited in claim 36 further comprising:

receiving an encrypted stored-value card signature from said security card via said payment server that is unreadable by said client terminal;

receiving a raw stored-value card signature from said stored-value card; and transmitting to said merchant server said encrypted stored-value card signature and said raw stored-value card signature for comparison by said merchant server, whereby message traffic between said payment server and said client terminal, and between said payment server and said security card is reduced, and whereby said merchant server may be informed that said sale of merchandise is a success and said merchant server may release said merchandise to a user associated with said stored-value card.

41. A method as recited in claim 36 further comprising:

receiving a key from said merchant server for encrypting said draw request message to be sent to said payment server;

receiving an encrypted version of said key that is unreadable by said client terminal, said key being encrypted using a shared key that is known to said payment server and to said merchant server; and sending said encrypted version of said key to said payment server without sending said key in the clear to said payment server, whereby said payment server may decrypt and obtain said key to decrypt said draw request message.

42. A method as recited in claim 36 further comprising:

receiving a debit command from said payment server destined for said stored-value card, said debit command being generated by said security card;

receiving a security card signature for validating said security card to said stored-value card, said security card signature being received in the same message from said payment server as said debit command; and receiving an expected stored-value card signature for comparison to an actual stored-value card signature, said expected stored-value card signature being received in the same message from said payment server as said debit command, whereby message traffic between said payment server and said client terminal, and between said payment server and said security card is reduced.

43. A computer-implemented method of interacting with a security card to facilitate the sale of merchandise over a network, said method comprising:

receiving a draw request message from a client terminal over said network, said draw request message including a plurality of responses from a stored-value card generated in response to emulation of security card commands, and also including a purchase amount for said merchandise, whereby network traffic between said payment server and said client terminal is reduced;

emulating said stored-value card responses in an interaction with said security card associated with said payment server;

receiving a plurality of security card responses from said security card in response to said emulation; and sending a debit command destined to said client terminal over said network so that said debit command may be processed by said stored-value card associated with said client terminal to facilitate said sale of merchandise.

44. A method as recited in claim 43 wherein said network is an internet over which said recited steps of said method occur and to which is connected a merchant server having a merchant web site for advertising said merchandise over said internet, wherein said client terminal and said merchant server are at separate locations.

45. A method as recited in claim 43 further comprising:

sending transaction information regarding said sale of merchandise to a clearing and administration system for reconciling said sale with said merchant server.

46. A method as recited in claim 43 further comprising:

a confirmation step for performing the function of confirming said sale of merchandise to said merchant server, whereby said merchant server is informed that said sale of said item is a success and said merchant server may release said merchandise to a user associated with said stored-value card.

47. A method as recited in claim 43 further comprising:

receiving a debit command from said security card;

receiving a security card signature from said security card along with said debit command; and receiving an expected stored-value card signature from said security card along with said debit command, whereby message traffic between said payment server and said security card is reduced and said security card may be released sooner.

48. A method as recited in claim 43 further comprising:

receiving said draw request message that is encrypted with a session key;

receiving an encrypted version of said session key, said session key being encrypted using a shared key that is known to said payment server and to said merchant server; and decrypting said session key using said shared key, whereby said payment server may decrypt said draw request message using said session key.

49. A method as recited in claim 43 further comprising:

sending a security card signature for validating said security card, said security card signature being sent in the same message destined to said client terminal as said debit command; and sending an expected stored-value card signature for comparison to an actual stored-value card signature, said expected stored-value card signature being sent in the same message destined to said client terminal as said debit command, whereby message traffic between said payment server and said client terminal, and between said payment server and said security card is reduced.

50. A method as recited in claim 43 wherein said steps of receiving a draw request and sending a debit command are routed through said client terminal to reduce network traffic.

51. A computer-implemented method of selling merchandise over a network using a merchant server, said merchandise for purchase by a user with a stored-value card, said method comprising:

establishing communication between said merchant server and a client over said network;

receiving a request from said client to purchase an item available from said merchant server;

transmitting to said client a purchase amount of said item so that said client may build a draw request message using information obtained from a stored-value card and debit said stored-value card associated with said client by said amount upon receiving a debit command from a security card;

transmitting said amount, a transaction identifier and a merchant identifier to a payment server connected to said network, said payment server being associated with said security card that creates said debit command intended for said stored-value card and secures the purchase of said item, said transaction identifier uniquely identifying the purchase of said item and said merchant identifier uniquely identifying said merchant server to said payment server; and a confirmation step for performing the function of confirming said purchase of said item to said merchant server, whereby said merchant server is informed that said sale of said item is a success and said merchant server may release said item to said user associated with said stored-value card.

52. A network payment system for authenticating a user over a network using a stored-value card, said network payment system comprising:

- a router for routing communication between entities attached to said network;
- a web server in communication with said network, said web server presenting benefits available for redemption in exchange for points associated with said user;
- a client terminal in communication with said network, said client terminal including a card reader for communicating with said stored-value card, an output device for reviewing said benefits, and an input device for initiating a redemption transaction to redeem points for one of said benefits, said client terminal being arranged to build a redemption message using information obtained from said stored-value card, said stored-value card being arranged to debit points from itself upon receiving a points debit command from a security card; and
- an authentication server in communication with said network, said authentication server including an interface for communicating with said security card and being arranged to receive said redemption message including an indication of said redemption transaction and to transmit an authentication message to said web server over said network, said security card being arranged to create said points debit command intended for said stored-value card, whereby said web server is authorized to release one of said benefits to a user associated with said stored-value card.

53. A computer-implemented method of authenticating a user over a network using a stored-value card, said method comprising:

- establishing communication between a web server and a client over said network, said client in communication with a stored value card of a user;
- receiving a request from said client to redeem points associated with said user for a benefit presented on said web server;
- transmitting to said client a points redemption amount so that said client may build a redemption request message using information obtained from a stored-value card and debit said stored-value card associated with said client by said points redemption amount upon receiving a points debit command from a security card;
- transmitting said points redemption amount, a transaction identifier and a web server identifier to an authentication server connected to said network, said authentication server being associated with said security card that creates said points debit command intended for said stored-value card, said transaction identifier uniquely identifying said redemption request message and said web server identifier uniquely identifying said web server to said authentication server; and
- an authentication step for performing the function of authenticating said user to said web server, whereby said web server is informed that said user is authorized to redeem said points redemption amount for said benefit and said web server may release said benefit to said user.

54. A network payment system as recited in claim 52 wherein said authentication message transmitted from said authentication server to said web server authenticates said stored-value card of said user.

55. A network payment system as recited in claim 52 wherein said stored-value card stores said points, wherein said client terminal is arranged to debit a portion of said points from said stored-value card, and wherein said authentication message transmitted from said authentication server to said web server confirms that said portion of points have been debited from said stored-value card.

56. A method as recited in claim 53 wherein said authentication step authenticates said user to said web server by authenticating said stored-value card of said user.

57. A method as recited in claim 53 further comprising:

- debiting said points from said stored-value card of said user; and
- wherein said authentication step authenticates said user by confirming that said points have been debited from said stored-value card.

* * * * *